United States Patent
Cody et al.

(10) Patent No.: US 8,582,938 B2
(45) Date of Patent: Nov. 12, 2013

(54) FIBER OPTIC DISTRIBUTION CABLES AND STRUCTURES THEREFORE

(75) Inventors: Joseph T. Cody, Hickory, NC (US); Dennis M. Knecht, Hickory, NC (US); Christopher Paul Lewallen, Hudson, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 1063 days.

(21) Appl. No.: 11/432,579

(22) Filed: May 11, 2006

(65) Prior Publication Data

US 2007/0263964 A1    Nov. 15, 2007

(51) Int. Cl.
*G02B 6/44*      (2006.01)

(52) U.S. Cl.
USPC ........... 385/100; 385/102; 385/104; 385/105; 385/106

(58) Field of Classification Search
USPC .......................................... 385/1, 35–137, 11
See application file for complete search history.

(56) References Cited

U.S. PATENT DOCUMENTS

| | | | |
|---|---|---|---|
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,861,575 A | 1/1999 | Broussard | 174/20 |
| 7,088,893 B2 * | 8/2006 | Cooke et al. | 385/100 |
| 7,136,555 B2 * | 11/2006 | Theuerkorn et al. | 385/100 |
| 2002/0064364 A1 | 5/2002 | Battey et al. | 385/136 |
| 2005/0259928 A1 * | 11/2005 | Elkins et al. | 385/100 |
| 2006/0093278 A1 | 5/2006 | Elkins, II et al. | 385/76 |
| 2006/0193594 A1 * | 8/2006 | Greenwood et al. | 385/147 |
| 2007/0025668 A1 * | 2/2007 | Greenwood et al. | 385/103 |

FOREIGN PATENT DOCUMENTS

| | | |
|---|---|---|
| JP | 62-54204 | 8/1985 |
| JP | 5-19130 | 7/1991 |
| JP | 2001-116968 | 4/2001 |
| WO | WO00/26710 | 5/2000 |
| WO | WO2006/044080 A1 | 4/2006 |

* cited by examiner

*Primary Examiner* — Mark Robinson
*Assistant Examiner* — Hung Lam

(57) ABSTRACT

Fiber optic distribution cables and methods for manufacturing the same are disclosed. The fiber optic distribution cables present one or more optical fibers outward of the protective covering for distribution of the same toward the subscriber. In one fiber optic distribution cable, a length of distribution optical fiber that is removed from the distribution cable and presented outward of the protective covering is longer than the opening at access location. In another embodiment, a demarcation point is provided for inhibiting the movement (i.e., pistoning) of the distribution optical fiber into and out of the distribution cable. In still another embodiment, an indexing tube is provided for indexing a tether tube within the indexing tube for providing the distribution optical fiber with a suitable excess fiber length. Additionally, other embodiments may include a fiber optic distribution cable having a dry construction and/or a non-round cross-section.

30 Claims, 28 Drawing Sheets

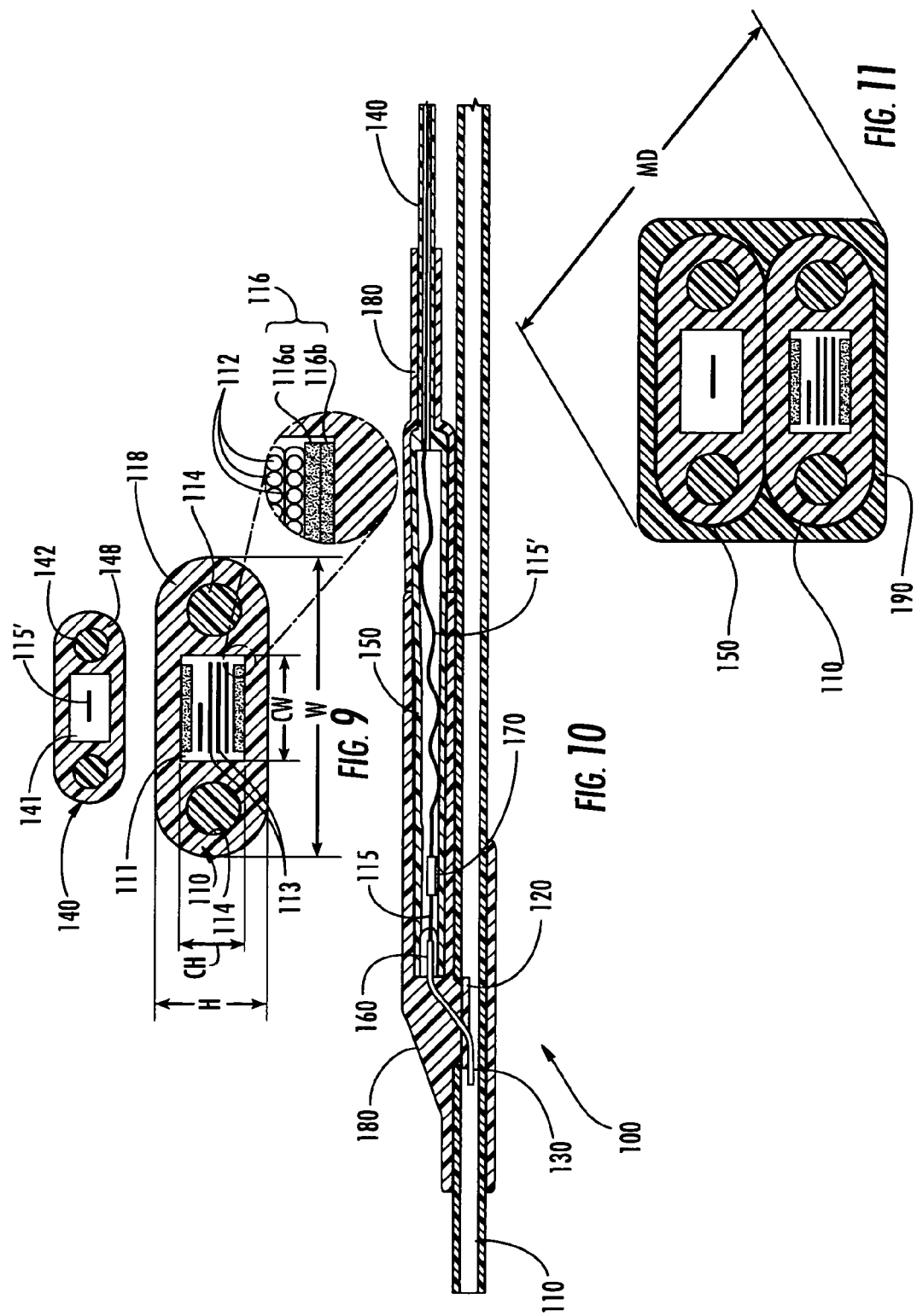

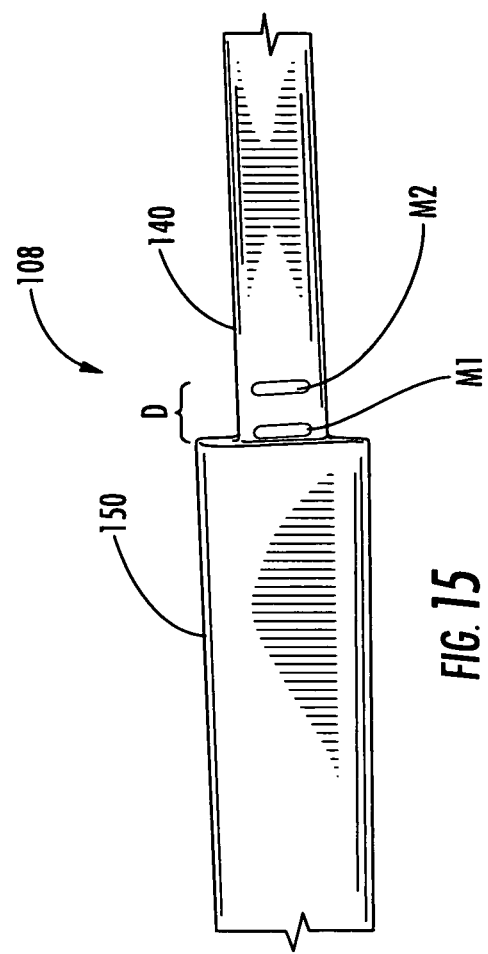
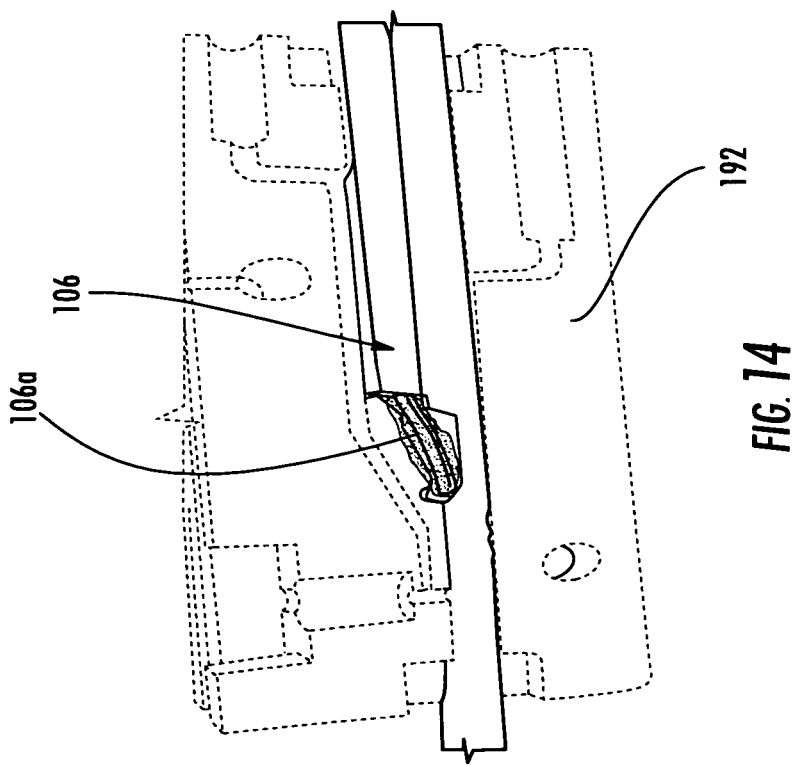
FIG. 15
FIG. 14

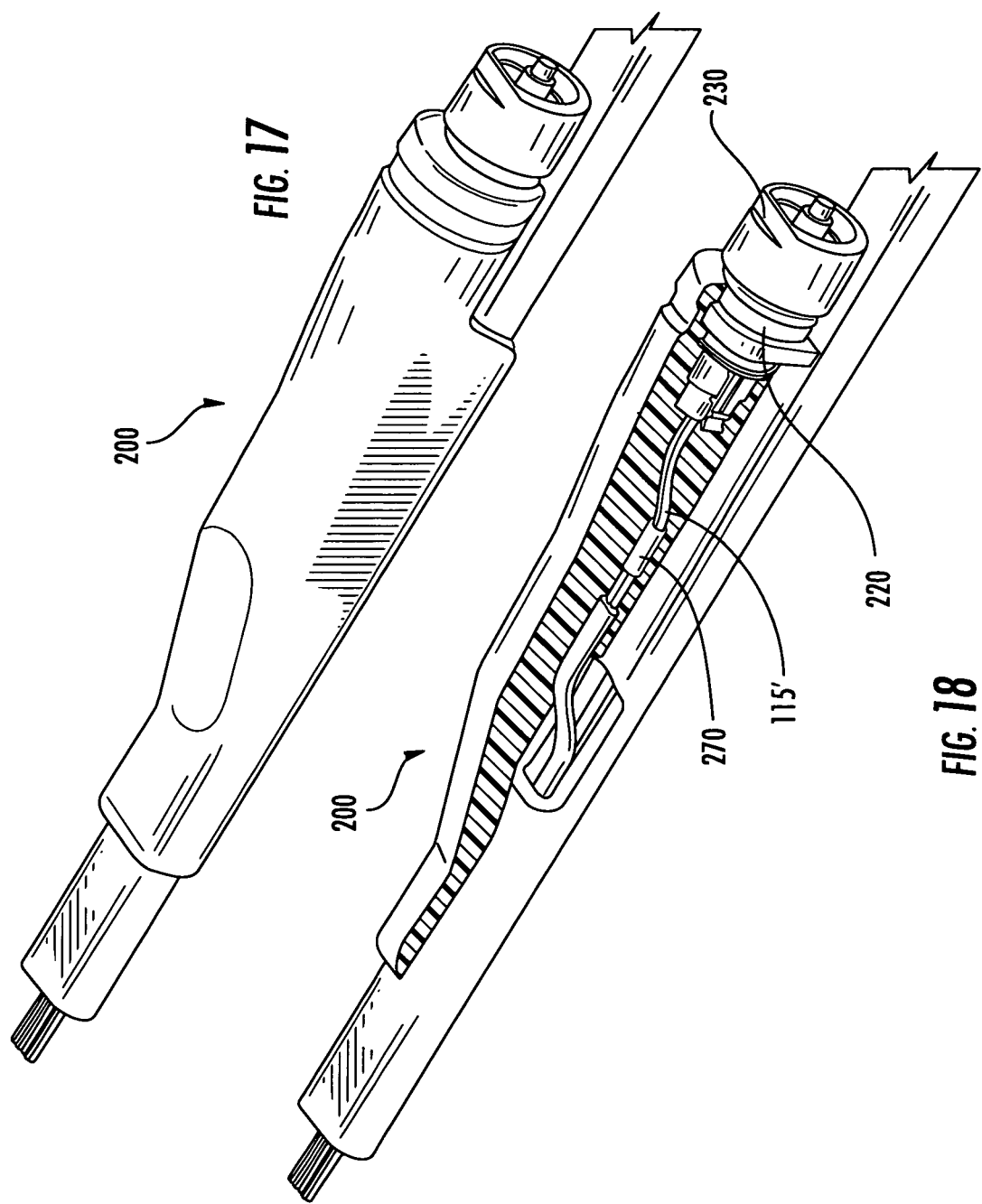

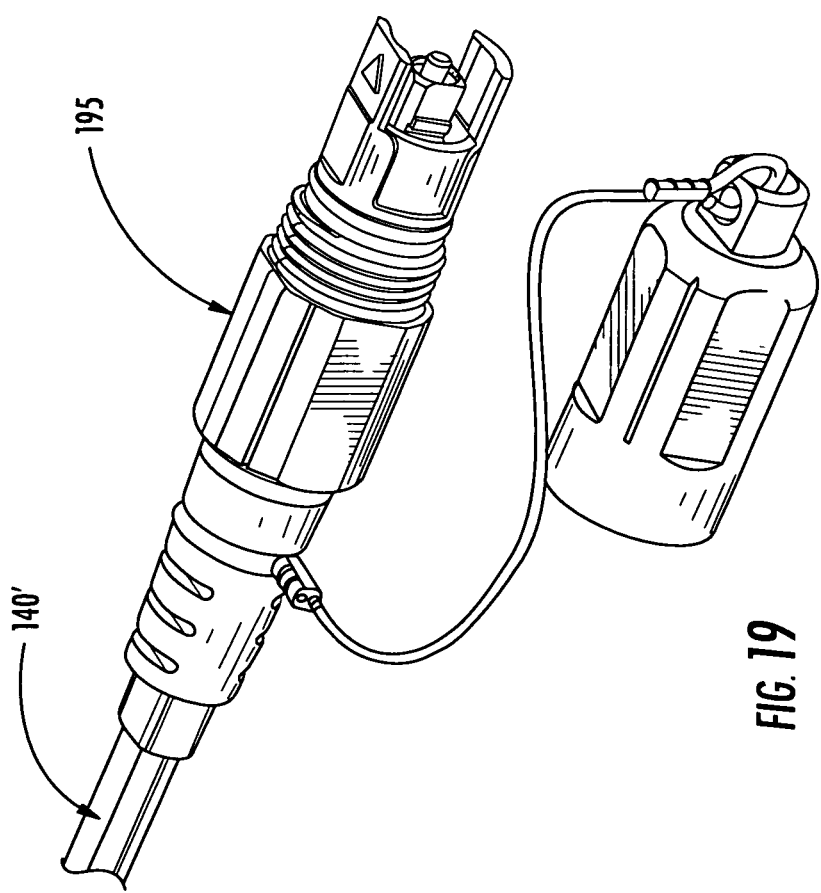

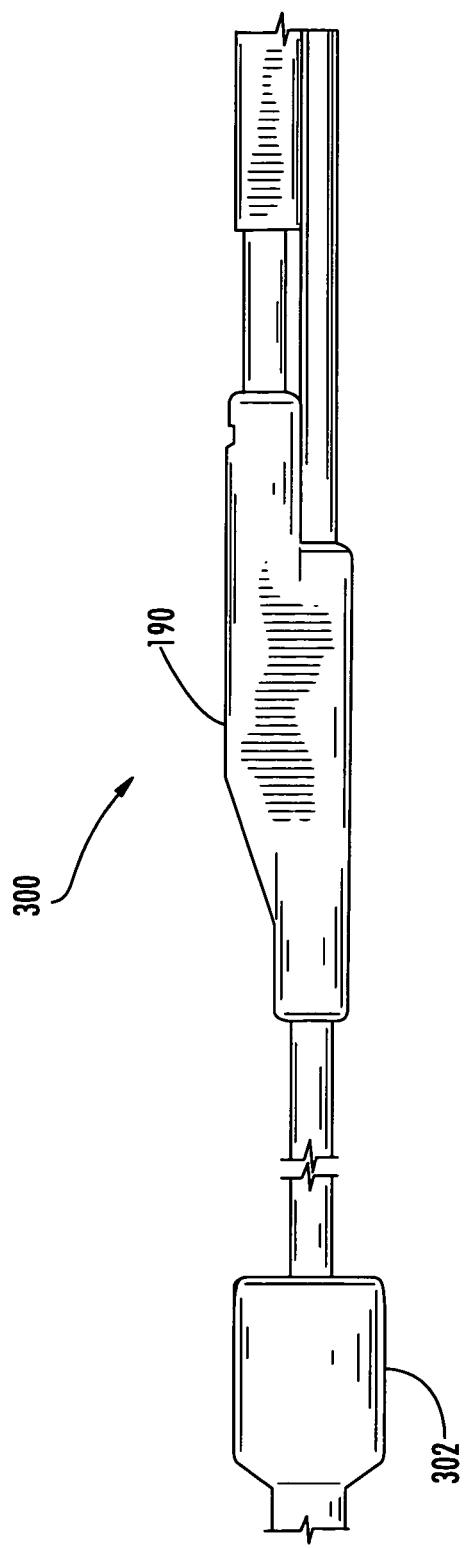

FIBER OPTIC DISTRIBUTION CABLES AND STRUCTURES THEREFORE

RELATED APPLICATIONS

The present application is related to U.S. patent application Ser. No. 11/432,637 titled "Tools and Methods for Manufacturing Fiber Optic Distribution Cables", U.S. patent application Ser. No. 11/432,311 titled "Methods for Manufacturing Fiber Optic Distribution Cables"; and U.S. patent application Ser. No. 11/432,654 titled "Kits of Parts for Manufacturing Fiber Optic Distribution Cables" all filed on even date herewith, the disclosures of which are incorporated herein by reference.

FIELD OF THE INVENTION

The present invention relates generally to fiber optic distribution cables, methods for manufacturing the same, tools, and kits therefor. More particularly, the present invention relates to fiber optic distribution cables, methods of manufacturing the same, tools, and kits for distributing optical fibers toward subscribers such as in optical fiber to the home or curb applications (FTTx).

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical fiber cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from fully utilizing the relatively high-bandwidth capacity of the optical fiber long-hauls links.

As optical fibers are deployed deeper into communication networks, subscribers will have access to increased bandwidth. But certain obstacles exist that make it challenging and/or expensive to distribute optical fibers toward the subscriber from fiber optic cables. By way of example, one conventional method for accessing optical fibers for distribution from a fiber optic cable requires making a relatively long breach in the cable jacket for accessing a suitable length of optical fiber. FIG. 1 depicts a fiber optic cable 10 having a breach B in the cable jacket with a breach length BL. Breach length BL depends on the length of an optical fiber OF required by the craft for the access procedure. By way of example, if the craftsman required 30 centimeters of distribution optical fiber OF for the access procedure, then breach length BL has a slightly longer length such as 35 centimeters for presenting 30 centimeters of optical fiber OF outside the cable jacket. More specifically, the optical fiber desired for distribution is selected and cut near the downstream end of breach B and then arranged to exit the fiber optic cable near the upstream end of breach B, thereby giving the craftsman optical fiber OF with the required length. One drawback for this method is that the breach length BL is relatively long and disrupts the protection provided by the cable jacket. Stated another way, breach B must be closed and/or sealed in order to provide proper protection, which requires a relatively large covering that is bulky, cumbersome, and/or stiff. Consequently, the distribution fiber optic cable is too large and/or stiff at the distribution location, thereby making effective routing of the distribution fiber optic cable through sheeves, ducts, or the like during installation difficult, if not impossible.

Another conventional method for accessing optical fibers for distribution from a fiber optic cable requires breaching the cable jacket in two locations as shown in FIG. 2. FIG. 2 depicts a fiber optic cable 10' with a first cable jacket breach B1 and a second (i.e., downstream) cable jacket breach B2 that are spaced apart by a significant distance D. By way of example, a typical distance D between cable jacket breaches B1,B2 is about thirty centimeters. Then, the optical fiber OF desired for distribution toward the subscriber is selected and cut at the location of the second cable jacket breach B2. Thereafter, the optical fiber OF that was cut at the second cable jacket breach B2 is then located at first cable jacket breach B1 and then pulled toward the first cable jacket breach B1 until it protrudes therefrom as shown. Simply stated, optical fiber OF for distribution must be located twice (once at each jacket breach B1,B2) and the length of optical fiber OF protruding from the first cable jacket breach B1 is dependent on distance D between cable jacket breaches B1,B2. Typically, the cable jacket breaches B1,B2 are closed for providing environmental protection such as by overmolding or using a heat shrink tubing. Thus, this conventional procedure for accessing and presenting optical fibers for distribution is time consuming, may damage the optical fibers, and/or creates a relatively large protrusion after sealing the cable jacket breaches.

Consequently, it would be desirable for distribution fiber optic cables to have low-cost solutions that are craft-friendly for installation. Moreover, solutions should also offer relatively small-footprints, flexible distribution locations, easy servicing/repair, and/or versatility for connectivity. Additionally, the reliability and robustness of the distribution fiber optic cable assembly may have to withstand the rigors of an outdoor environment. The present invention provides reliable and low-cost solutions that are craft-friendly for distributing optical fibers toward the subscriber from a fiber optic cable with a relatively small and flexible distribution location.

SUMMARY OF THE INVENTION

One aspect of the present invention is directed to a fiber optic distribution cable for routing optical fibers toward the subscriber. The fiber optic distribution cable includes a plurality of optical fibers within a protective covering and a distribution optical fiber. The distribution optical fiber is one of the plurality of optical fibers of the fiber optic distribution cable that is presented outward of the protective covering at an access location for distribution toward the subscriber. The access location has a length AL and the distribution optical fiber removed from the fiber optic distribution cable has a distribution optical fiber length DOFL, wherein the distribution optical fiber length is about 5/4 AL or more.

Another aspect of the present invention is directed to a fiber optic distribution cable including a plurality of optical fibers, a protective covering, a distribution optical fiber, and a demarcation point. The distribution optical fiber being one of the plurality of optical fibers of the fiber optic distribution cable that is presented outward of the protective covering at an access location. The demarcation point being disposed about a portion of the distribution optical fiber for inhibiting the movement of the distribution optical fiber. In other words, the demarcation point inhibits the distribution optical fiber from pistoning into or out of the fiber optic distribution cable.

Yet another aspect of the present invention is directed to a fiber optic distribution cable including a plurality of optical fibers, a protective covering at least one distribution optical fiber, an indexing tube, and a tether tube. The at least one distribution optical fiber is selected from one of optical fibers of the fiber optic distribution cable and protrudes from an access location of the protective covering. The tether tube is disposed about a portion of the at least one distribution optical fiber for protecting the at least one distribution optical fiber. Also, the tether tube is attached at a predetermined position relative to the indexing tube, thereby loading an excess fiber length in the distribution optical fiber. Additionally, other steps which may or may not require other components can be performed on the fiber optic distribution cables by the craft. For instance, a transition tube may be slid over the distribution optical fiber for protecting the same.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operations of the invention.

BRIEF DESCRIPTION OF THE DRAWINGS

FIG. 9 is a cross-sectional view of the fiber optic distribution cable assembly of FIG. 7 taken along line 9-9.

FIG. 10 is another cross-sectional view of the fiber optic distribution assembly cable of FIG. 7 taken along line 10-10 and FIG. 10a is a view of a portion of the cross-sectional view of FIG. 10.

FIG. 11 is another cross-sectional view of the fiber optic distribution assembly cable of FIG. 7 taken along line 11-11.

FIGS. 12-16 are perspective views showing portions of the distribution cable assembly of FIG. 7 in various stages of construction.

FIG. 17 is a perspective view of yet another fiber optic distribution cable that includes a ferrule according to the present invention.

FIG. 18 is a perspective view of the distribution cable of FIG. 17 with a portion of the overmold removed for clarity.

FIG. 19 is a perspective view of a tether tube having a preconnectorized plug attached thereto for plug and play connectivity according to the present invention.

FIG. 21 is a side view of a fiber optic distribution cable having a safety pulling device according to the present invention.

DETAILED DESCRIPTION OF THE INVENTION

Figure 1:
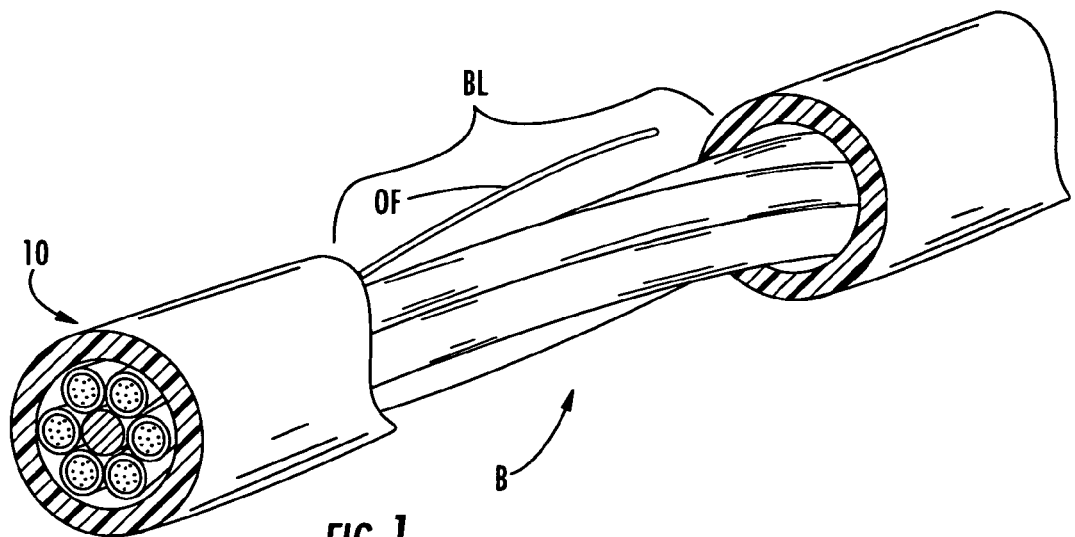
FIG. 1 is a perspective view of a conventional method for opening a fiber optic cable over a relatively large length to access a suitable length of optical fiber for distribution of the same.
Figure 2:
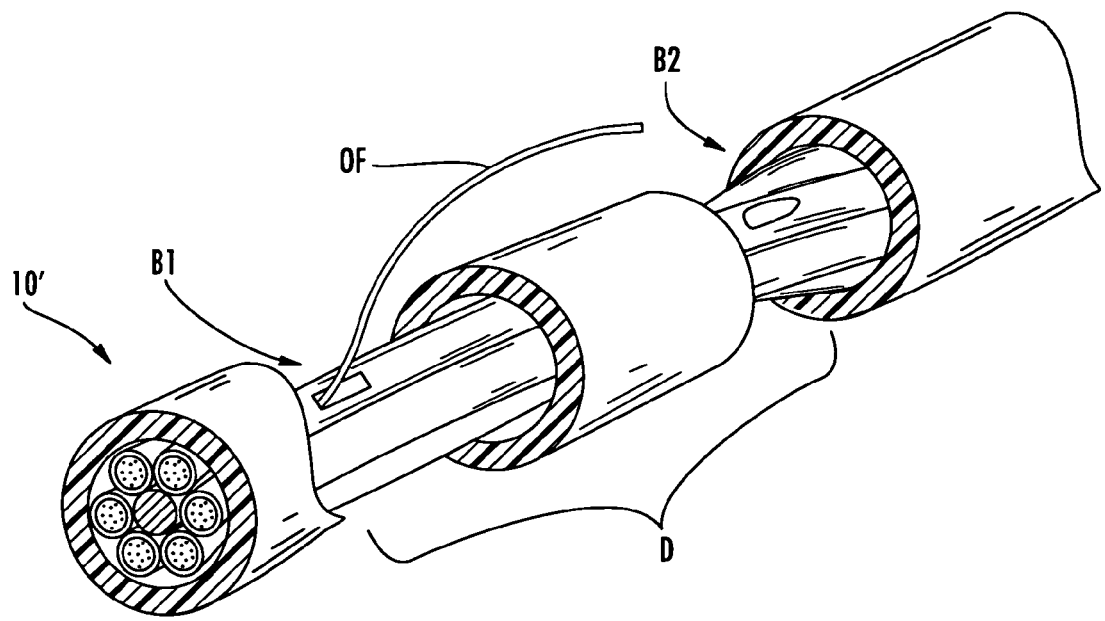
FIG. 2 is a perspective view of another conventional method for opening a fiber optic cable in two locations to access a suitable length of optical fiber for distribution of the same.

Reference will now be made in detail to the present preferred embodiments of the invention, examples of which are illustrated in the accompanying drawings. Whenever possible, the same reference numerals will be used throughout the drawings to refer to the same or like parts. The present invention discloses distribution fiber optic cables and methods of making the same where one or more optical fibers of a fiber optic cable are presented outside a protective covering such as a cable jacket for distribution. Additionally, the present invention also discloses tools for the methods of making along with kits of parts useful for making the distribution fiber optic cables. In one embodiment, a relatively small opening is formed at the access location of the fiber optic cable, thereby leaving a relatively small access footprint (i.e., removing a small portion of the protective covering and/or other cable components) on the fiber optic cable. Even though a relatively small opening is made at the access location (e.g., cable jacket breach), the method advantageously provides a length of distribution optical fiber protruding from the access location that is longer than the opening of the access location. By way of example, if the opening in the cable jacket is about 2 centimeters the distribution optical fiber is cut within the distribution cable and has a length of about 2.5 centimeters or more. In other words, the craft has a suitable length of distribution optical fiber to work with for distribution, while only having to manage one relatively small opening or breach in the protective covering per access location. Unlike the conventional access methods, this embodiment of the present invention does not require: (1) multiple cable breaches for a single access location; or (2) a relatively long cable jacket breach or opening that is about as long as the length of distribution optical fiber. Consequently, the conventional access methods result in stiff, bulky, and relatively large distribution footprints after reclosing or sealing the access location for protection. Whereas the length and/or cross-sectional area of access locations for fiber optic distribution cables of the present invention are relatively small and flexible, thereby overcoming the problems of the conventional methods for accessing fiber optic cables to provide a suitable length of distribution optical fiber outward of the protective covering. However, certain aspects of the present invention may be practiced with more than one cable breach or other aspects of the conventional methods.

Figure 3:
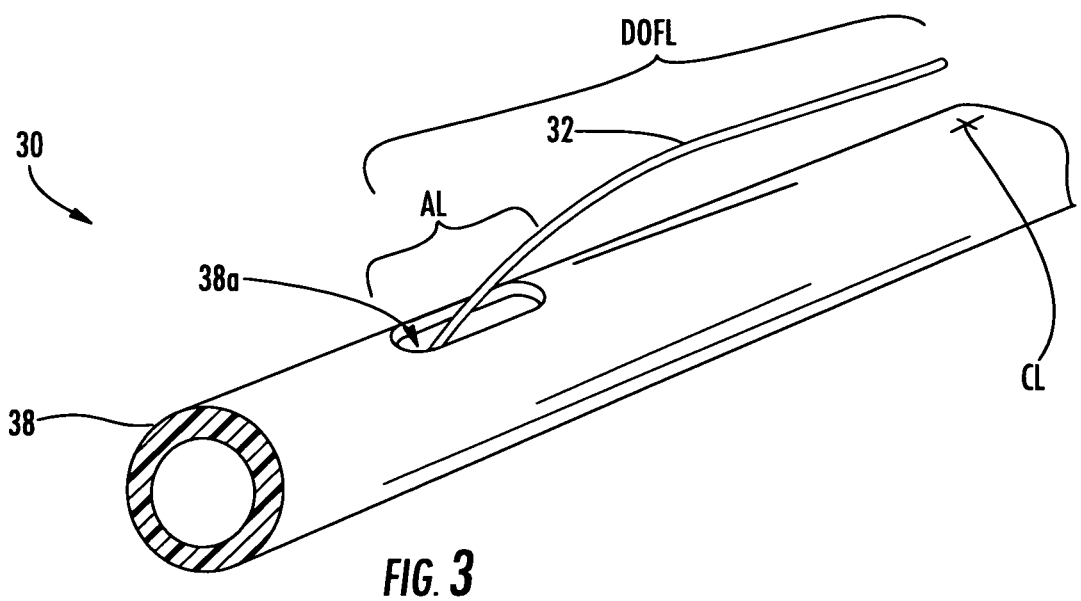
FIG. 3 is a perspective view of a generic fiber optic distribution cable showing a distribution optical fiber protruding from a first access location of a fiber optic distribution cable after being severed at a cutting location within the fiber optic distribution cable according to the present invention.
Figure 3A:
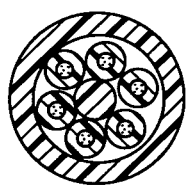
FIGS. 3a-3g are cross-sectional views of exemplary fiber optic distribution cables that are represented by the generic fiber optic distribution cable of FIG. 3.
Figure 3B:
Figure 3C:
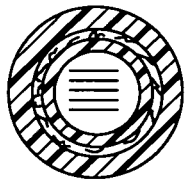
Figure 3D:
Figure 3E:
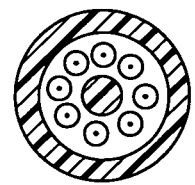
Figure 3F:
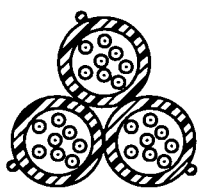

FIG. 3 shows a perspective view of a generic distribution fiber optic cable 30 (hereinafter distribution cable 30) according to the present invention. Distribution cable 30 depicts a distribution optical fiber 32 protruding from a first access location 38a in a protective covering 38 such as a cable jacket. As depicted, first access location 38a has an access length AL, which is the length of the opening or breach in protective covering 38. Additionally, distribution optical fiber 32 has a distribution optical fiber length DOFL that is about 5/4 times the access length AL or longer and more preferably about 3/2 times the access length AL or longer. In other words, distribution optical fiber 32 was cut or severed at a cutting location CL within distribution cable 30. Illustratively, if the access length AL is 5 centimeters (i.e., the opening or breach of protective covering 38 at first access location 38a), then distribution optical fiber 32 has a distribution optical fiber length DOFL of about 6 centimeters or longer and more preferably about 7.5 centimeters or longer. Simply stated, the distribution optical fiber length DOFL is greater than the access length AL of the first access location 38a since the distribution optical fiber is cut from within the fiber optic cable. Thus, the present invention provides the craft with a suitable length of distribution optical fiber while using a relatively small opening or breach in the protective covering, thereby allowing a relatively small footprint for the distribution configuration selected. Of course, cable 30 may have any suitable number of distribution optical fibers 32 protruding from first access location 38a. Likewise, fiber optic distribution cables can have any suitable number of access locations disposed along the cable as desired. Fiber optic distribution cables of the present invention may also use one or more different methods and/or components for constructing the fiber optic distribution cable based on the type of fiber optic cable selected and type of connectivity desired.

Figure 3G:
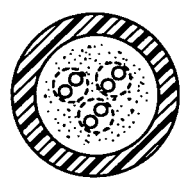

Distribution cable 30 is generic since it represents fiber optic cables that allow cutting of the distribution optical fiber within the protective covering according to the present invention. Illustratively, FIGS. 3a-3g depict a sampling of fiber optic cable constructions that are useful according to the present invention. Respectively FIGS. 3a-3g depict: a stranded loose tube cable (FIG. 3a); a slotted core cable (FIG. 3b); a monotube cable (FIG. 3c); a flat ribbon cable (FIG. 3d); an indoor cable (FIG. 3e); a cable having a plurality of tubes lashed together (FIG. 3f); and a cable having bundles (FIG. 3g). Simply stated, distribution cable 30 can have any suitable construction. Additionally, the present invention works with optical fibers of the different cables types such as a plurality of optical fiber ribbons, loose optical fibers, buffered optical fibers, bundles of optical fibers or the like.

Figure 4:
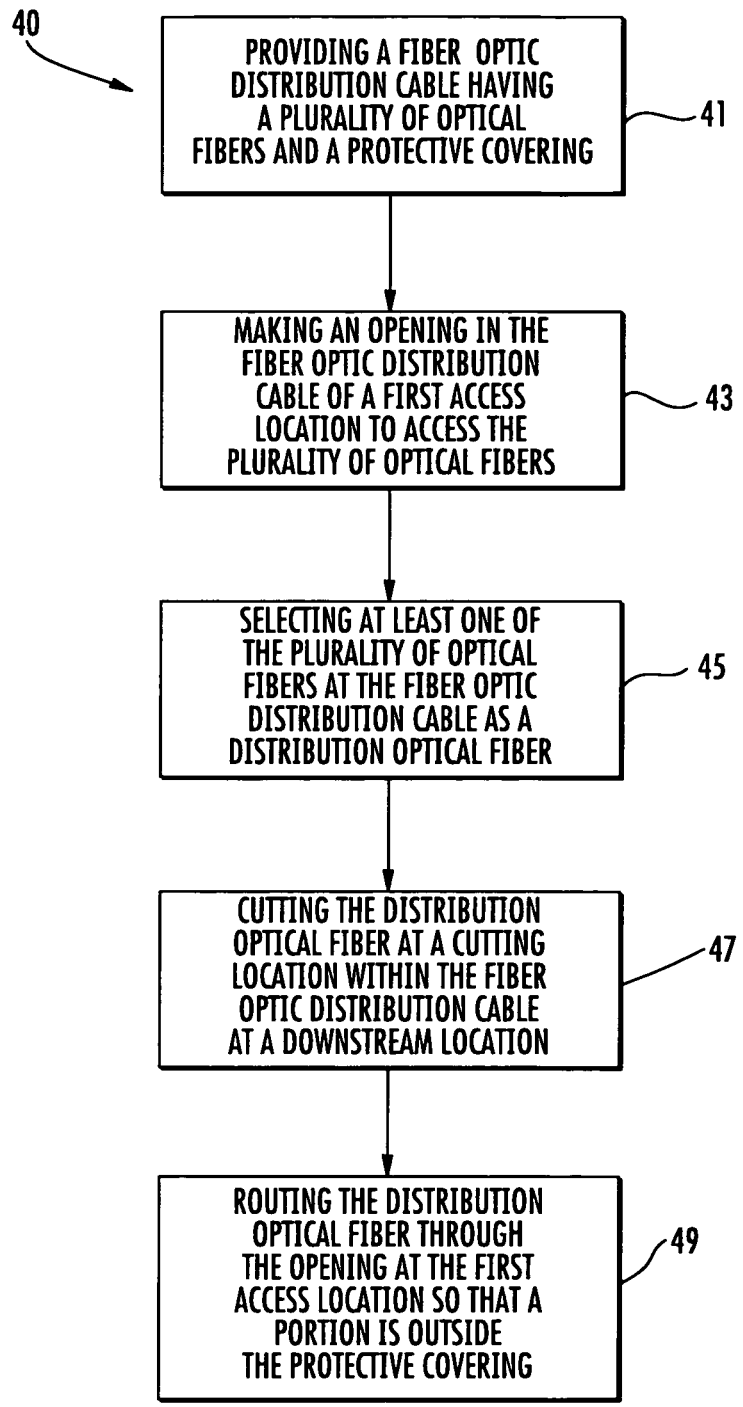
FIG. 4 is a flowchart showing the steps of the method for making the fiber optic distribution cable of FIG. 3 according to the present invention.

FIG. 4 depicts a flowchart 40 of a method for manufacturing a distribution cable using the concepts of the present invention. First, a step 41 of providing a distribution cable such as distribution cable 30 having a plurality of optical fibers (not visible) and a protective covering such as a cable jacket is required. Next, a step 43 of making an opening (i.e., opening or breaching the protective covering) in the distribution cable at a first access location is performed for accessing one or more of the plurality of optical fibers within the distribution cable. More specifically, the protective covering is opened at the first access location with an access length AL that is sufficient for practicing the method disclosed herein. One reason this method of the present invention is advantageous over prior distribution methods is that it only requires one relatively small opening per access location. Moreover, depending on the construction of the distribution cable selected, other cable components, or portions thereof, may require being cut, opened, and/or removed for accessing the desired optical fibers within the distribution cable. For instance, the craftsman may have to remove or cut away a portion of a water-swellable tape, armor, strength members or the like for gaining access to the plurality of optical fibers within the distribution cable. Thereafter, method 40 requires a step 45 of selecting at least one of the plurality of optical fibers of the distribution cable as a distribution optical fiber.

Figure 6A:
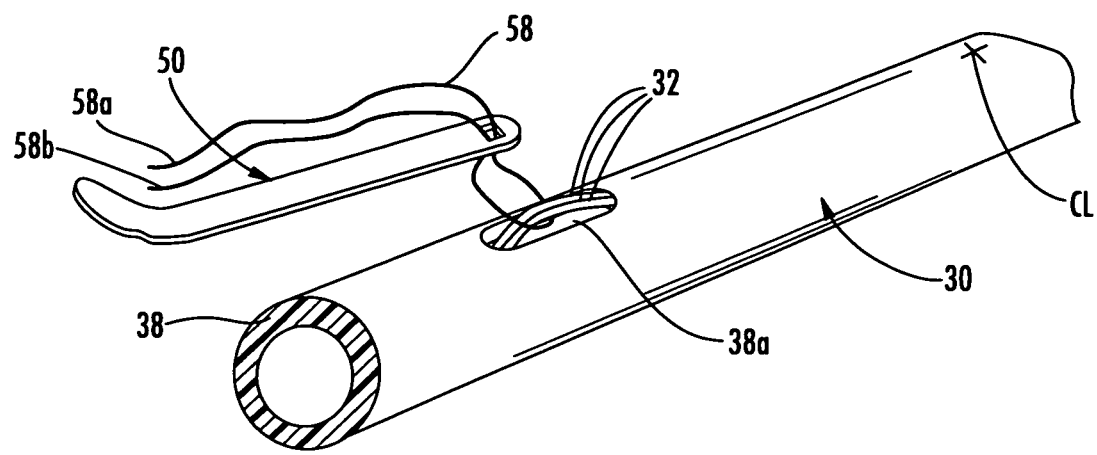
FIG. 6a depicts the tool of FIG. 5 with the cutting element looped about a plurality of distribution optical fibers of the fiber optic distribution cable of FIG. 3 before severing.
Figure 6B:
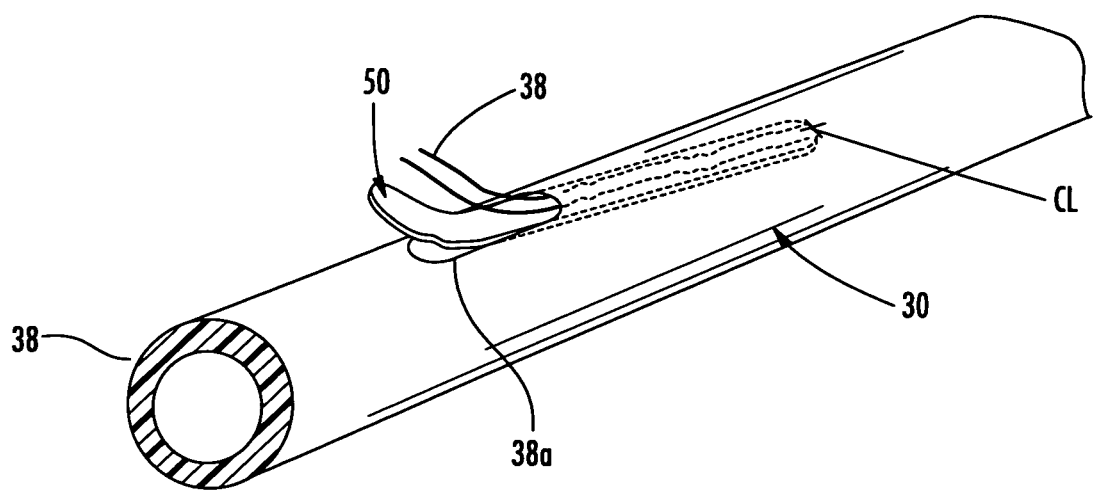
FIG. 6b depicts the tool of FIG. 5 inserted within the fiber optic distribution cable of FIG. 3 for severing the distribution optical fiber at the cutting location within the fiber optic distribution cable.

Then the craft performs a step 47 of cutting (i.e., severing) the distribution optical fiber 32 at a cutting location within the distribution cable at a downstream location. As used herein, a cutting location within the distribution cable means a location along the distribution cable where the protective covering is not breached. As best shown in FIGS. 6a and 6b, the step of cutting is performed by positioning and inserting a suitable cutting tool within the distribution cable, thereby allowing the tool to cut one or more distribution optical fibers at the cutting location within the distribution cable. Thereafter, a step 49 of routing the distribution optical fiber through the opening at the first access location so that a portion of the distribution optical fiber is disposed outside the protective covering is performed. Other optional steps are also possible after the distribution optical fiber is presented outside the protective covering. For instance, the distribution cable can optionally include other steps and/or components such as providing a demarcation point, a transition tube, or components suitable for optical connectivity.

The method of flowchart 40 is useful for either factory or field applications because it is simple, reliable, and craft-friendly. Illustratively, the method of flowchart 40 only requires one access location opening per distribution location and the distribution optical fiber length DOFL presented at the access location that is longer than the length of the cable breach or opening. Other methods may include one or more optional steps such as providing other components and/or other steps. More specifically, the method may further include one or more of the steps such as: providing a transition tube for routing the distribution optical fiber (FIG. 6c); providing a cap for closing the first access location (FIG. 6c); providing a demarcation point about the distribution optical fiber (FIG. 6i); providing a tether tube about the distribution optical fiber (FIG. 10); providing a plug (FIG. 10a) for the index tube and/or tether tube; sealing the first access location (FIG. 14); providing an indexing tube for creating excess fiber length or excess ribbon length in the distribution optical fiber (s) (FIG. 15); and/or attaching a ferrule, a connector body, or the like (FIGS. 17 and 18). Furthermore, a kit of parts as disclosed herein is useful for practicing the methods and/or constructing the distribution cables of the present invention.

Figure 5:
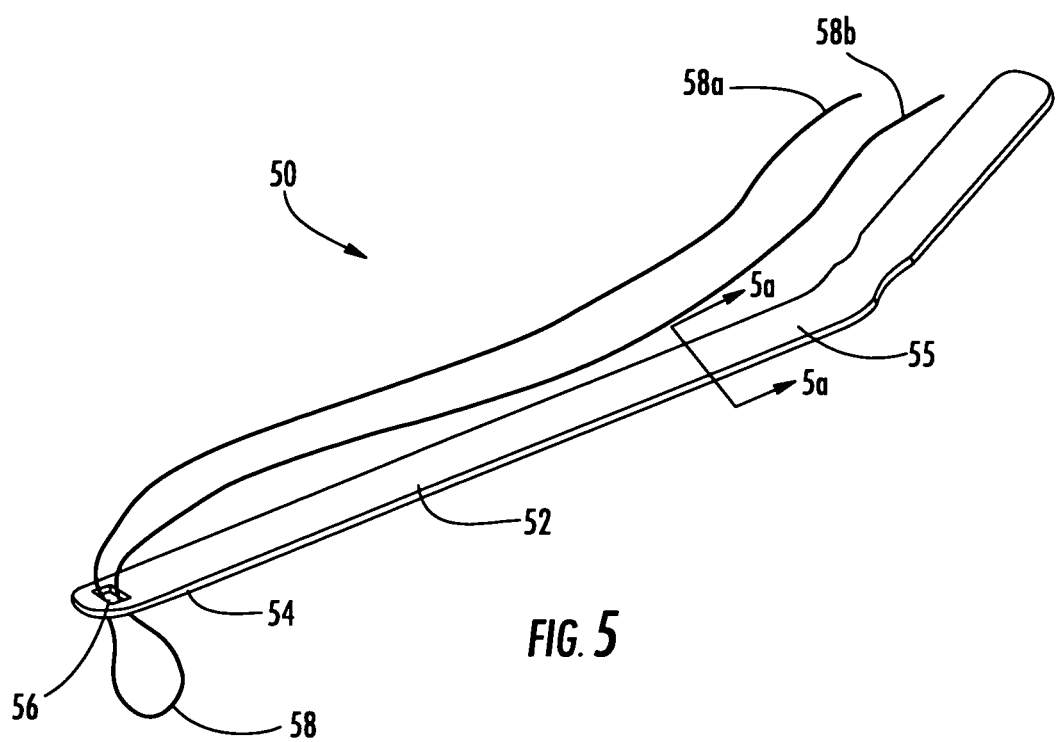
FIGS. 5 and 5a-5f are respectively are perspective views of an explanatory tool and variations on the explanatory tool for severing an optical fiber within a fiber optic distribution cable according to the present invention.

FIG. 5 depicts an explanatory tool 50 for severing one or more distribution optical fibers within the distribution cable according to the invention. Tool 50 has an elongate body 52 having a first end 54 with an opening 56 and a cutting element 58. Cutting element 58 is flexible for fitting into opening 56 and is able to move through opening 56 when pulled, thereby severing or cutting one or more distribution optical fibers at the cutting location within the distribution cable. More specifically, pulling cutting element 58 causes the optical fibers captured by cutting element 58 to bend beyond their ultimate bending radii so that they are severed or cut. As best shown by FIG. 6a, cutting element 58 is looped about one or more distribution optical fibers and both ends 58a,58b of cutting element 58 are routed through opening 56 and positioned toward a second end 55 of tool 50 that is bent upward, thereby forming a handle for the operator. Thereafter, tool 50 can be slid into the distribution cable to the desired cutting location (i.e., the loop in the cutting element is adjacent to the cutting location) and then both ends 58a,58b of cutting element 58 are pulled until one or more distribution optical fibers within the distribution cable are severed. Consequently, the distribution optical fiber length DOFL has a length that is greater than the breach in the protective covering because the distribution optical fiber is cut within the distribution cable.

Cutting element 58 requires certain characteristics for cutting or severing one or more distribution optical fibers. For example, cutting element 58 must have the necessary strength for severing the distribution optical fiber without breaking when pulled and the flexibility for looping into the at least one opening of the elongate body while moving through the at least one opening when pulled. Cutting element 58 can use any suitable structure, size, shape, and/or material for meeting these requirements. Examples include structures such as one or more filaments, threads, rovings, or yarns and examples of shapes include round, rectangular, and the like. In one embodiment, cutting element 58 is a aramid material such as Kevlar having a denier of about 2450. However, cutting element 58 may be formed from other suitable materials such as polymer material such as polyester or nylon, fishing line, a metallic material such as a steel wire, a cotton material, or the like. For instance, one embodiment may use fifty pound test fishing line such as sold under the tradename SpiderWire®.

Figure 5A:
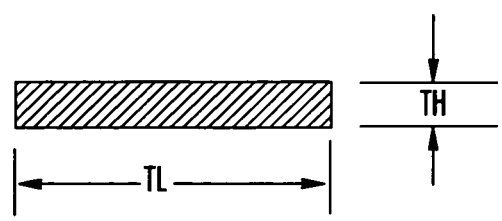

Likewise, elongate body 52 may be formed from any suitable material such as metal or plastic that allow suitable dimensions for fitting within the selected distribution cable and yet remain somewhat flexible while having the necessary strength. As depicted in FIG. 5a, elongate body 52 is formed from steel tape having a tool height TH of about 2 millimeters or less and a tool width TW of about 8 millimeters or less, thereby making it flexible in one direction. As shown, opening 56 has a generally rectangular shape with a length of about 5 millimeters and a width of about 2 millimeters, but opening 56 can have other suitable sizes and/or shapes. Of course, the size and shape of the elongate body can be tailored for the size and shape of the space of the distribution cable that the tool must fit within such as rectangular or round. For instance, a tool with an arcuate-shape or rod-shape may be better suited for sliding into a round buffer tube. Additionally, other variations of tool 50 are contemplated by the present invention.

Figure 5C:
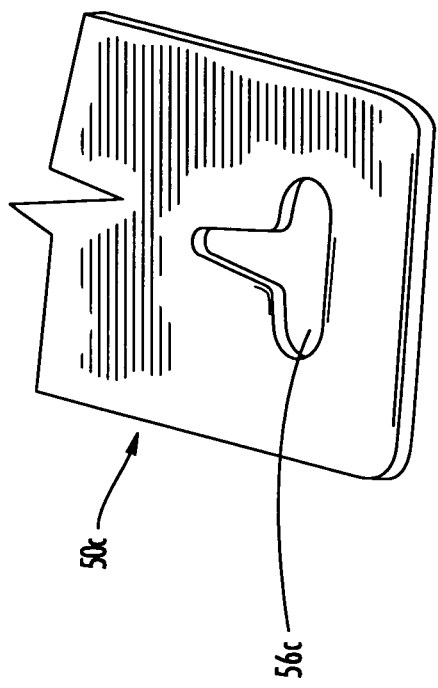
Figure 5E:
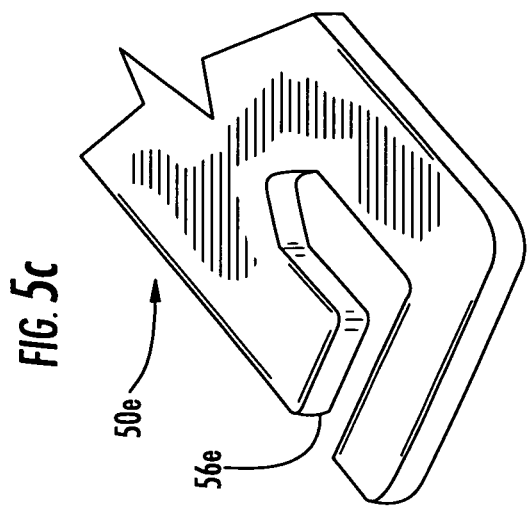
Figure 5D:
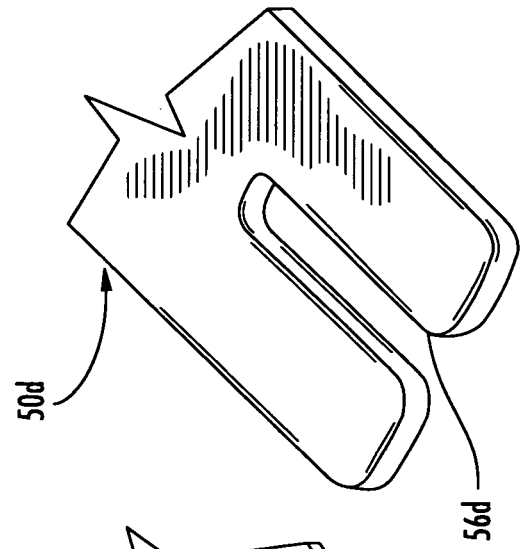
Figure 5B:
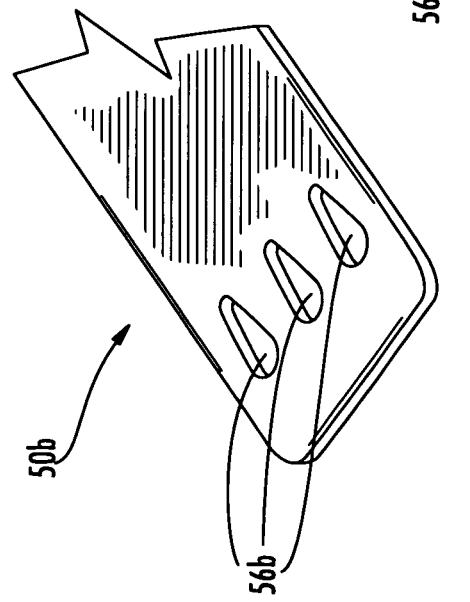
Figure 5F:
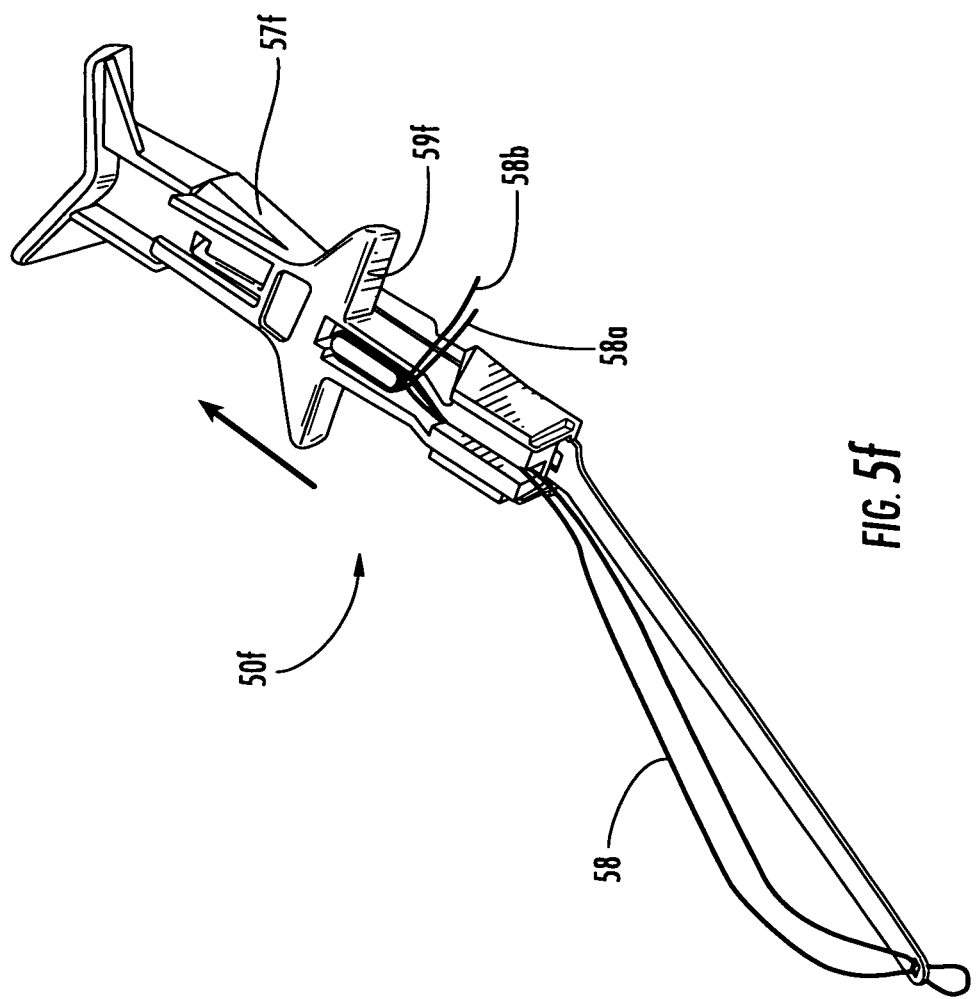

FIGS. 5b-5f depict variations on the explanatory tool according to the invention. FIG. 5b depicts a portion of a tool 50b that has a plurality of openings 56b near the first end. As depicted, tool 50b has three openings 56b so the location of cutting element 58 may be varied across the width of tool 50b. FIG. 5c depicts a portion of tool 50c having an opening 56c that is non-round and larger for easily passing the ends of the cutting element therethrough and guiding the cutting element when pulled. Likewise, the opening of the tool need not close on itself. For instance, FIGS. 5d and 5e respectively depict portions of tools 50d and 50e where the openings 56d,56e are in communication with the outer edge of the tool, thereby making the insertion of cutting element 58 into the tools easier. FIG. 5f depicts tool 50f having a handle 57f having a movable portion 59f for pulling cutting element 58 in order to severe one or more distribution optical fibers. As shown, both ends 58a,58b of cutting element 58 are wrapped about a protrusion (not numbered) of moveable portion 59f of handle 57f so when it is actuated movable portion 59f pulls in the direction shown by the arrow, thereby pulling on both ends 58a, 58b of cutting element 58 to cut the distribution optical fiber. Of course, other tool variations are possible for pulling, wrapping, routing, mounting, or otherwise altering the tools disclosed for severing the distribution optical fiber.

FIGS. 6a and 6b depict the use of tool 50 with distribution cable 30 of FIG. 3. More specifically, FIG. 6a shows distribution cable 30 after the opening is made at the first access location and one or more optical fibers are selected as the distribution optical fibers. As further shown, cutting element 58 of tool 50 looped is about the plurality of distribution optical fibers 32 that were selected. Stated another way, tool 50 and its cutting element 58 are positioned to cut a plurality the optical fibers that are captured by the loop of the cutting element 58. Additionally, both ends 58a,58b of cutting element 58 are moved toward the second end 55 of tool 50 and cutting element 58 is snugged-up about distribution optical fibers 32. Thereafter, tool 50 is inserted within distribution cable 30 and slid into a downstream location (e.g., away from the head end of distribution cable). FIG. 6b illustrates tool 50 inserted within distribution cable 30 for severing a plurality of distribution optical fibers at cutting location CL. Thereafter, ends 58a,58b of cutting element 58 are pulled with a force sufficient to severe the distribution optical fibers 32 disposed between the loop of cutting element 58 and elongate body 52. After tool 50 is removed from within the distribution cable 30, the distribution optical fibers 32 that are severed within the distribution cable 30 are routed through the opening at the first access location 38a so that a portion of the distribution optical fiber is routed outside protective covering 38 as shown in FIG. 3. From this point, distribution cables of the present invention may further include other manufacturing steps and/ or other components for making other assemblies of the present invention such as splicing to the distribution optical fiber and/or attaching a ferrule to the distribution optical fiber.

Figure 6C:
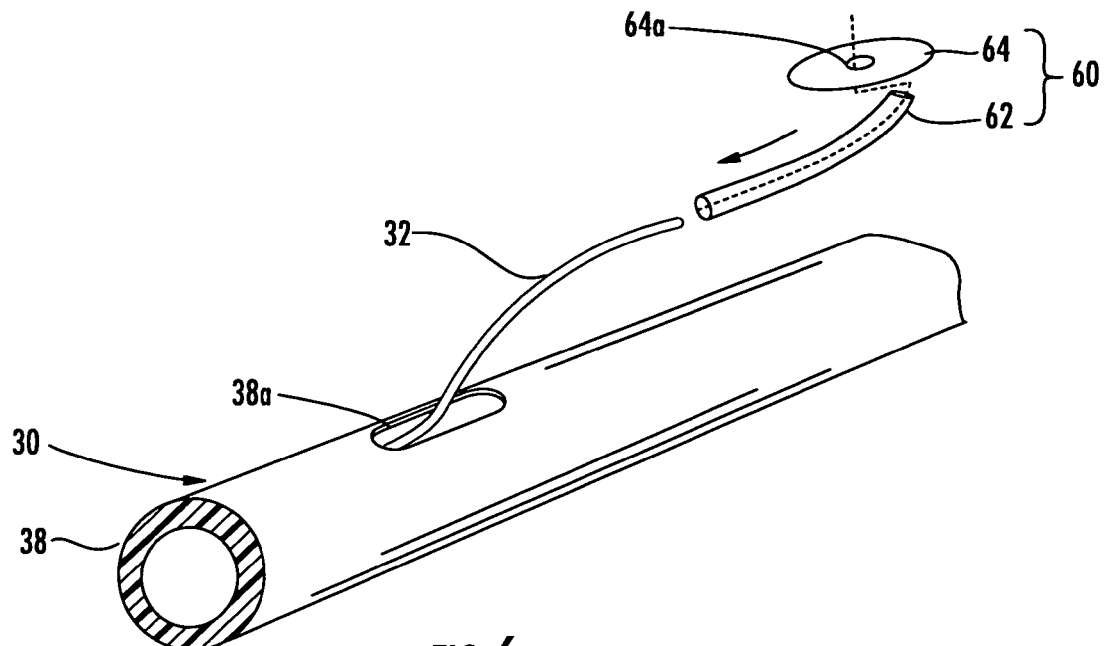
FIG. 6c depicts the fiber optic distribution cable of FIG. 3 along with an exploded view of a kit of parts according to the present invention.

For instance, FIG. 6c shows distribution cable 30 of FIG. 3 along with a kit of parts 60 for closing first access location 38a and routing the distribution optical fibers 32 outside protective covering 38. More specifically, kit of parts 60 includes a transition tube 62 for routing and protecting distribution optical fibers 32 outside of protective covering 38 and a cap 64 for closing first access location 38a and shielding the other optical fibers within the distribution cable. In this embodiment, the transition tube allows limited movement of the distribution optical fiber into and out of the distribution cable (i.e., allows pistoning) when it is bent. Generally speaking, the transition tube allows the distribution optical fiber to have a pass-through construction permitting limited movement of the same using the transition tube as a pass-through conduit. In other embodiments, a demacaration point is disposed about the distribution optical fiber at or near the access location, thereby generally inhibiting the pistoning of the same into and out of the distribution cable. The use of the pass-through construction or demarcation point construction may depend on the distribution cable construction and/or cable characteristics such as the degree of optical fiber coupling within the cable. In other words, some cable designs are better suited for free pass-through, while other cable configurations are better suited for the demarcation point. Additionally, the transition tube may used with the demarcation point if distribution optical fiber is generally fixed by a material, thereby creating a demarcation point.

Figure 6D:
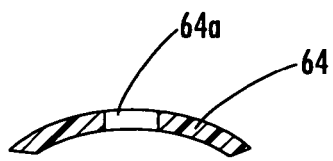
FIG. 6d is a cross-sectional view of the cap of FIG. 6c.
Figure 6E:
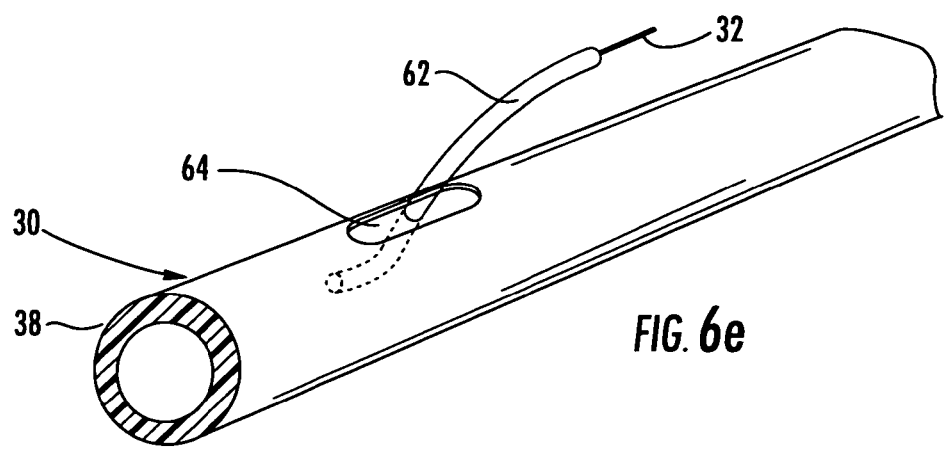
FIG. 6e is a perspective view of the fiber optic distribution cable of FIG. 3 along with a kit of parts of FIG. 6c assembled thereon according to the present invention.
Figure 6F:
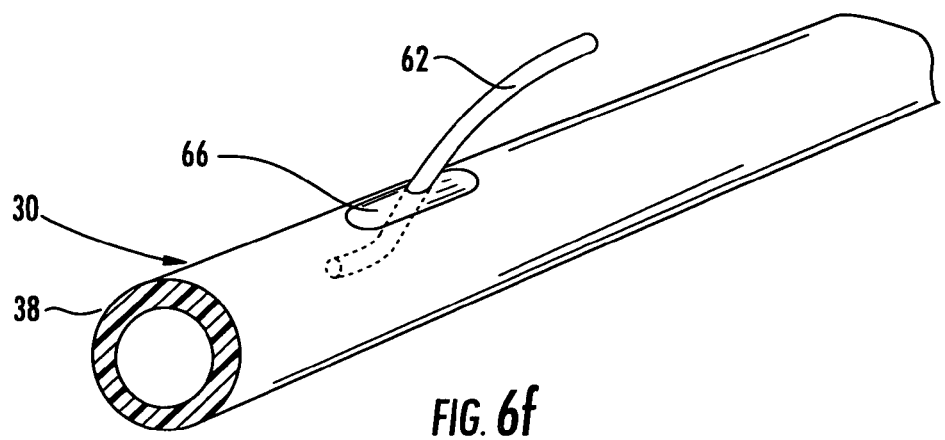
FIG. 6f depicts the assembly of FIG. 6e after the cap is secured using a suitable material.
Figure 6G:
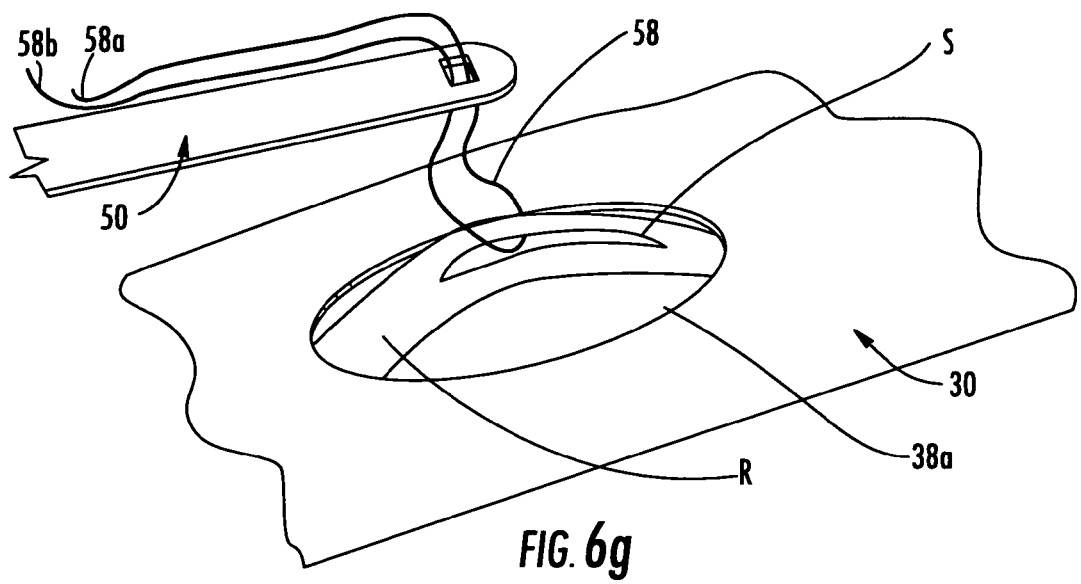
FIG. 6g depicts the tool of FIG. 5 positioned about a portion of a fiber optic ribbon for splitting the optical fiber ribbon along its length before severing the distribution optical fibers at the cutting location.
Figure 6H:
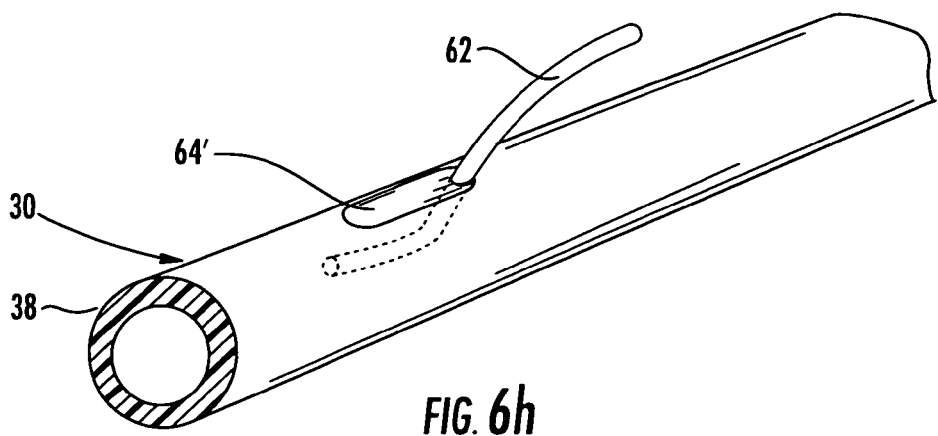
FIG. 6h is a perspective view of the fiber optic distribution cable of FIG. 3 with an alternative cap configuration according to the present invention.

As depicted, cap 64 includes an opening 64a that is sized for receiving transition tube 62 therethrough such as round, rectangular, etc. After distribution optical fibers 32 are routed through first access location 38a to extend beyond protective covering 38, transition tube 62 is slid over the distribution optical fibers 32 and may be pushed into a portion of distribution cable 30 as shown in FIG. 6e. In other words, transition tube 62 protects and routes distribution optical fibers as they transition from a position within the distribution cable to a position outside the distribution cable while allowing some movement. Then, the exposed end of transition tube 62 is routed through opening 64a of cap 64 so transition tube 62 extends therefrom as represented by the dotted line in FIG. 6c. Transition tube 62 is formed from a suitable material that is flexible, but may also be formed from a relatively rigid material. By way of example, transition tube 62 is a PTFE tube (i.e., a Teflon® tube) that is able to withstand the application of high temperatures. In another embodiment, the PTFE transition tube is chemically etched. Likewise, cap 64 is formed from a suitable material such as PTFE or other flexible material, but cap 64 may also be formed from a relatively rigid material. Further, caps for closing the access location can have other configurations. FIG. 6h shows a cap 64' using a notch (not numbered) as the opening for routing the transition tube and/or optical fiber outward of the protective covering. In other words, the distribution optical fiber and/or transition tube pass through notch of cap 64' and a portion of the access location. Of course, other kits of parts can include other components such as tools for cutting distribution optical fibers, tether tubes, indexing tubes, shrink tubing, sealing components, plugs and/or preconnectorized pigtails that may include ferrules, receptacles, connector bodies or the like. Likewise, other distribution cable assemblies of the present invention may include other components or steps as discussed herein.

As depicted in FIG. 6e, cap 64 is larger than the opening of the access location AL (i.e., longer) and is disposed so that a portion of the same extends under protective covering 38. Additionally, cap 64 may be relatively thin and flexible so that it is easily tucked under protective covering 38 by the craft. By way of example, cap 64 is sized so that about 5 millimeters of cap 64 is disposed under protective covering 38 at the ends and has a thickness of about 0.3 millimeters. After cap 64 is in position, a step of securing the same using a material 66 may be performed as depicted in FIG. 6f. In this embodiment, material 66 is a hot melt adhesive available from Loctite under the tradename Hysol 83245-232, but any suitable material or method may be used for securing the cap such as a glue, adhesive, silicone, sonic welding or the like as long as the material used is compatible with the optical fiber, ribbons, protective covering, and/or other components that it may contact. Additionally, cap 64 and/or material 66 may also function to inhibit any optional sealing material such as an overmolded sealing material from entering the distribution cable. Furthermore, it is possible to apply material 66 below cap 64.

Of course cap 64 can have other suitable configurations and can vary based on the distribution cable. For instance, cap 64 can be shaped or tailored to match the profile of the portion of the protective covering 38 that is removed from the distribution cable. In other words, the cap has a length and width to match the length and width of the opening of the first access location along with an inner and outer profile to match the protective covering profile of the section that was removed. Consequently, the cap closes the first access location with a generally flush surface. As an example, a generally round distribution cable jacket would use a cap having a similar inner and outer radius as the cable jacket with a suitable arc length, longitudinal length, and width to match the access location opening. FIG. 6d shows a cross-sectional view of cap 64 shaped for closing the access location of a generally round distribution cable, but other shapes, profiles, and/or lengths of the cap are possible to tailor the cap to fit other cables and/or openings. Additionally, cap 64 may be attached at the first access location 38a using a suitable material or method such as an adhesive, glue, sonic welding, or the like.

As discussed, the method of flowchart 40 requires selecting at least one optical fiber of the plurality of optical fibers of the distribution cable as a distribution optical fiber. Distribution cables can have any suitable arrangement and/or type of optical fibers therein and the concepts of the invention are useful with the different arrangements and/or types of optical fibers. For instance, the present invention is suitable with cables having bare optical fibers (e.g., the stranded loose tube cable of FIG. 3a) and cables having one or more ribbons (e.g., the slotted core cable of FIG. 3b, the monotube cable of FIG. 3c, or the flat ribbon cable of FIG. 3d). Still other distribution cables may have buffered optical fibers (FIG. 3e), bundles of optical fibers, or the like. Distribution cables having buffered optical fibers may require more force on the cutting element to sever the buffer layer and the optical fiber but are within the scope of the present invention. After the optical fibers for distribution are selected, a dividing tool (not shown) such as a thin piece of metal or plastic may be used at the access location for separating the selected optical fibers from the remaining portion of the distribution cable.

In cables using ribbons, it may be desirable to select less than all of the optical fibers of a ribbon as distribution optical fibers. By way of example, four distribution optical fibers may be desired at an access location and each ribbon of the distribution cable has twelve optical fibers. As shown in FIG. 6g, a ribbon R has a split S formed by the craft between the fourth and fifth optical fibers of ribbon R for a short distance near the access location. Thus, the desired optical fibers for distribution are segregated for splitting ribbon R along its longitudinal length before cutting the same. More specifically, FIG. 6g shows that cutting element 58 of tool 50 is then looped about the four segregated optical fibers of split ribbon R and tool 50 is positioned as before. Thereafter, the split S in the ribbon is propagated along its longitudinal length by the tool within the distribution cable. In other words, as tool 50 is slid within the distribution cable to the cutting location CL as before, cutting element 58 splits the ribbon along its longitudinal length by shearing the matrix material of the ribbon between the desired optical fibers as tool 50 is slid into position to the cutting location. Thereafter, the selected distribution optical fiber(s) is severed as before using the tool.

Figure 6I:
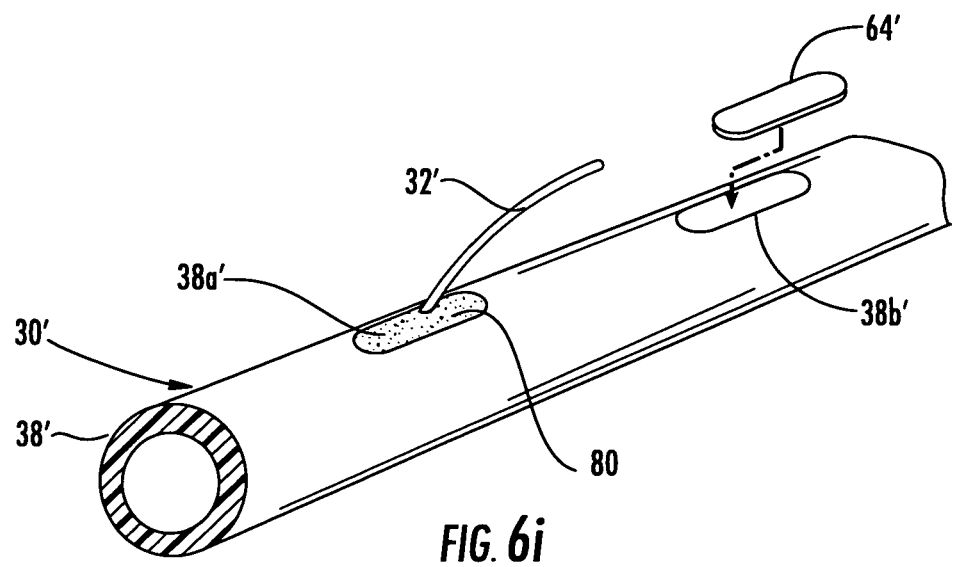
FIG. 6i is another fiber optic distribution cable having a demarcation point disposed about the distribution optical fiber according to the present invention.

As discussed above, the distribution optical fiber can be generally fixed for inhibiting movement. FIG. 6i depicts a distribution cable 30' having a demarcation point 80 for generally inhibiting the movement of the distribution optical fiber 32' at or near the access location. Generally speaking, demarcation point 80 fixes the distribution optical fiber near the access location for inhibiting movement of the same to reduce undue stresses on the distribution optical fiber such as during bending, thereby preserving optical performance. One method for providing demarcation point 80 is by applying or injecting a suitable material about the distribution optical fiber 32' at the access location. For instance, the demarcation material may be applied and/or injected into the distribution cable about the distribution optical fiber, thereby inhibiting the movement of the distribution optical fiber. Any suitable material may be used for the demarcation point such as a hot melt adhesive, silicone, or the like disposed about the distribution optical fiber. However, the material used for demarcation should be compatible with the optical fiber, ribbons, protective covering, and/or other components that it may contact. Additionally, demarcation point 80 may be used with or without a cap 64' and may be disposed inward or outward of the cap if used. If the cap is omitted, demarcation point 80 may also function to inhibit any optional sealing material such as an overmolded sealing material from entering the distribution cable.

Additionally, concepts of the present invention can be practiced without cutting the distribution optical fiber from within the distribution cable. For instance, FIG. 6i depicts a generic distribution cable 30' having a first and second opening 38a', 38b' in protective covering 38'. In other words, the demarcation point 80 is used with a conventional access method where the cable is opened in two locations 38a' and 38b' for obtaining the desired length of distribution optical fiber. Additionally, one or more of openings 38a', 38b' can be closed with suitable a cap 64' as depicted. Likewise, the method of providing excess fiber length for the distribution optical fiber by indexing as discussed below can be performed without cutting the distribution optical fiber from within the distribution cable.

Figure 7:
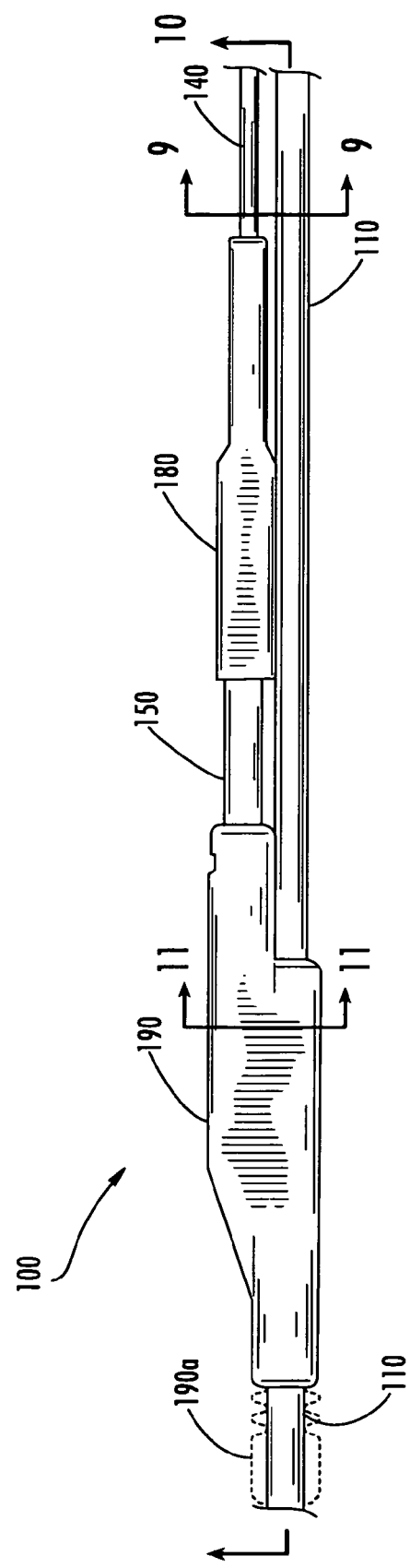
FIG. 7 is a side view of a fiber optic distribution cable assembly according to the present invention.
Figure 8:
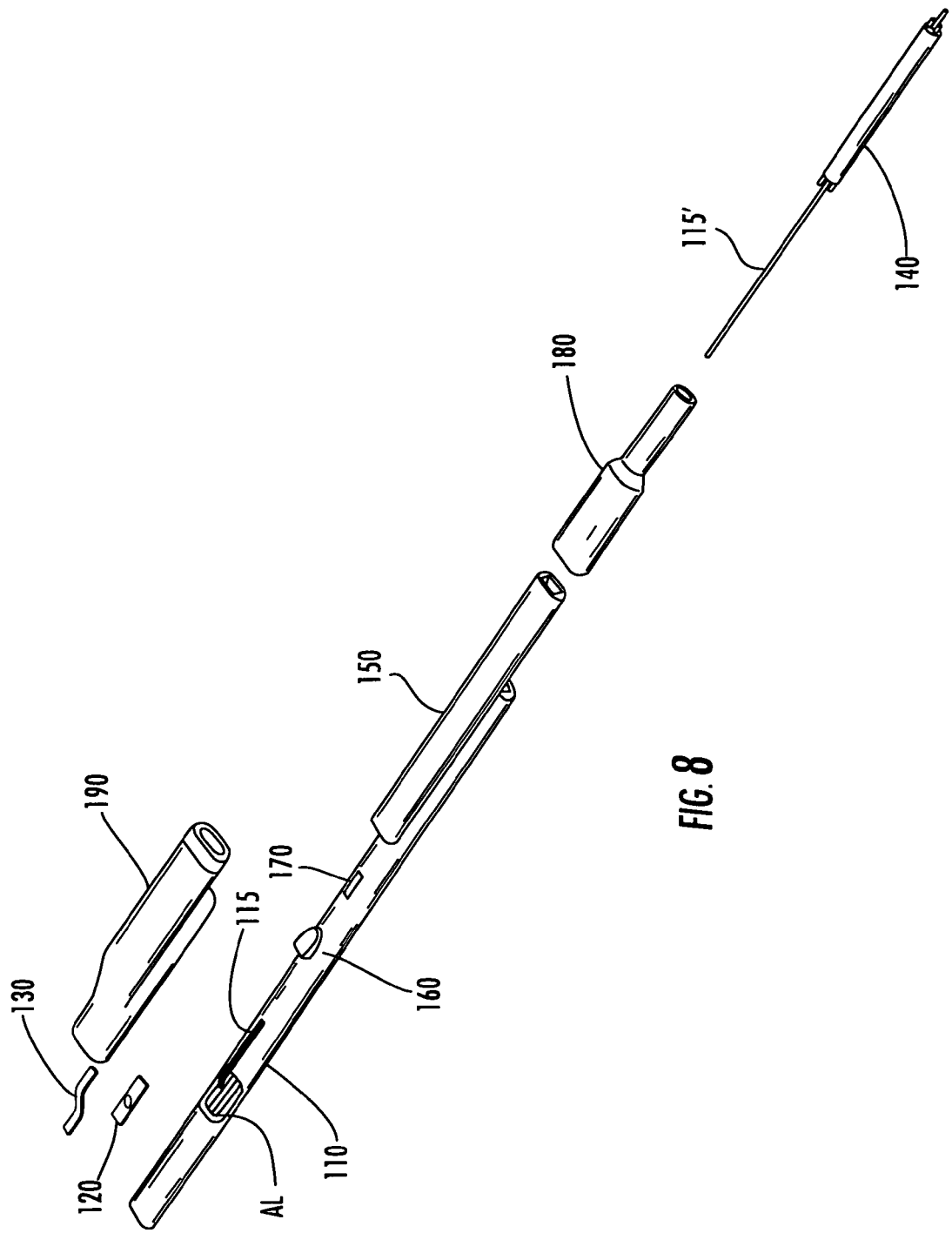
FIG. 8 is an exploded view of the fiber optic distribution cable assembly of FIG. 7 according to the present invention.
Figure 10A:
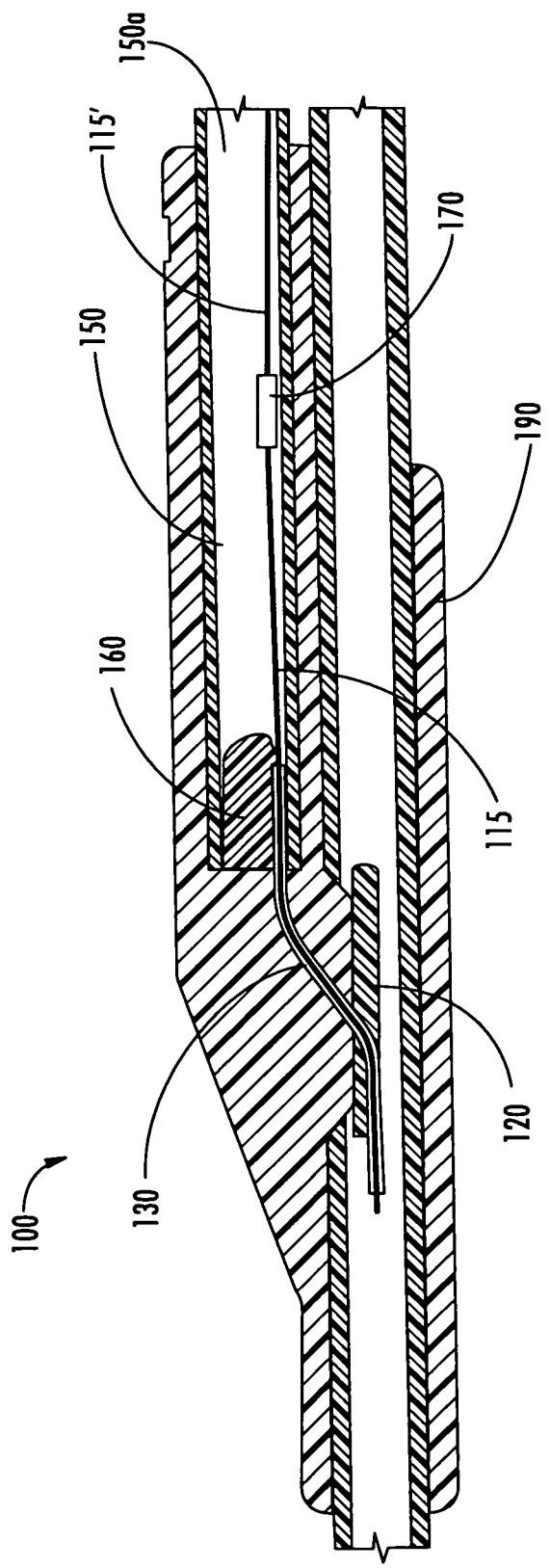

FIGS. 7 and 8 respectively are a perspective and an exploded view and of a specific explanatory fiber optic distribution cable assembly 100 (hereinafter cable assembly 100) according to the present invention. As best shown in FIG. 8, distribution cable assembly 100 includes a distribution cable 110, a distribution optical fiber pigtail 115', a cap 120 for access location AL, a transition tube 130, a tether tube 140, an indexing tube 150, an indexing tube plug 160, a splice protector 170, a heat shrink tube 180, and a sealing portion 190. FIGS. 9-11 are cross-sectional views of assembly 100 respectively taken along line 9-9, line 10-10, and line 11-11. Additionally, FIGS. 10 and 10a are shown with the cavity of the distribution cable empty for clarity purposes. Cable assembly 100 includes indexing tube 150 so that a predetermined amount of excess ribbon length (ERL) or excess fiber length (EFL) can be loaded into the distribution optical fiber as will be discussed. Loading ERL or EFL into the distribution optical fibers inhibits stresses on the same such as during bending of the cable assembly. Additionally, cable assembly 100 is one example of many different distribution cables according to the present invention that may include fewer or more components, components having different configurations, different arrangement of components, or the like.

FIG. 9 depicts that both distribution fiber optic cable 110 and tether tube 140 have a generally non-round cross-section such as a generally flat shape, thereby allowing a relatively small overall cross-sectional dimension for assembly 100. In other words, flat portions of distribution cable 110 and tether tube 140 are generally aligned to allow a small footprint compared with using two round cables. By way of example, distribution cable assembly 100 and other similar assemblies can have a cross-sectional maximum dimension MD as shown in FIG. 11, which is along a diagonal. Cross-sectional maximum dimension MD can vary based on the size of the components used, but in embodiments advantageous for duct specific applications the cross-sectional maximum dimension is about 30 millimeters or less, more preferably about 28 millimeters or less, and most preferably about 25 millimeters or less, thereby allowing the pulling of the cable assembly into the duct. Of course, other embodiments can have other larger or smaller cross-sectional maximum dimensions for the given application.

Distribution cable 10 is advantageous for several reasons, but the use of other distribution cables is possible. First, distribution cable 110 and other similar distribution cables are advantageous since they can have a relatively high optical waveguide count with a relatively small cross-sectional footprint. By way of example, distribution cable 110 has four ribbons each having twenty-four optical fibers for a total fiber count of ninety-six fibers. With twenty-four fiber count ribbons, distribution cable 110 has a major cable dimension W of about 15 millimeters or less and a minor cable dimension H of about 8 millimeters or less. Second, distribution cable 110 is easily accessed from either of the generally planar surfaces (e.g., top or bottom) of the cable so that the craft is able to access to any optical fiber desired for distribution. Third, distribution cable 110 allows quick and reliable access while inhibiting damage to the optical fibers or strength members during the access procedure. In other words, the craftsman can simply cut into the protective covering, thereby gaining access to the cable cavity having the optical fibers therein. Also, in this embodiment, distribution cable 110 has a dry construction (i.e., the cable excludes a grease or gel for waterblocking), thus the craft does not have to clean or remove grease or gels from the optical fibers, ribbons, tools, etc.

Of course, distribution cables according to the present invention may have any suitable dimensions, constructions, and/or fiber counts for the given application. By way of example, other distribution cables can include other components and/or structures for water-blocking such as grease, gel, extruded foams, silicones, or other suitable water-blocking components. Additionally, suitable water blocking structures may also be intermittent disposed along the distribution cable. Likewise, other distribution cables can have other suitable cable components such as armor, ripcords, or tubes. For instance, another embodiment of the distribution cable may have a toneable portion for locating the cable in buried applications.

As depicted in FIG. 9, distribution cable 110 includes a plurality of optical fibers 112 and a protective covering 118. In this embodiment, distribution cable 110 is a tubeless design having a cavity 111 for housing a plurality of optical fibers 112, which are configured as a plurality of ribbons 113 (represented by the horizontal lines) arranged in a non-stranded stack. Distribution cable 110 also includes strength members 114 and water-swellable components 116. As depicted, strength members 114 are disposed on opposite sides of cavity 111 and impart a preferential bend characteristic to distribution cable 110. Strength members 114 provide tensile and/or anti-buckling strength to the distribution cable and may be formed from any suitable materials such as dielectrics, conductors, composites or the like. Illustratively, strength member 14 are a round glass-reinforced plastic (grp) having a diameter of about 2.3 millimeters, which is smaller than the height of cavity 111. Of course, strength members 14 can have shapes other than round such as oval strength members.

Using water-swellable components 116 allows for a dry construction of distribution cable 110. Water-swellable components 116 can have any suitable form such as water-blocking yarn, thread, tape or the like. In this case, distribution cable 110 uses two water-swellable components 116 configured as elongate tapes that are paid-off reels. As depicted, the major (e.g. planar) surfaces (not numbered) of water swellable components 116 are generally aligned with the major (e.g. horizontal) surfaces (not numbered) of cavity 111, thereby allowing a compact and efficient configuration while generally inhibiting corner optical fiber contact as occurs with a ribbon stack disposed in a round tube. Moreover, the ribbons are generally aligned with a major surface (i.e. the horizontal surface) of the cavity 111 at the top and bottom and also generally aligned with the width (i.e. major surfaces) of the water-swellable components 116, thereby forming a ribbon/water-swellable component composite stack within cavity 111. Consequently, the rectangular (or square) ribbon stack is fitted to a corresponding generally rectangular (or square) cavity and avoids the issues associated with placing a rectangular (or square) ribbon stack within a round buffer tube (i.e. stresses on the corner fibers of the ribbon stack in a round buffer tube that can cause the cable to fail optical performance requirements such as bending).

More specifically, water-swellable components 116 are disposed on the top and bottom of the ribbon stack (not numbered) and include a compressible layer 116a and a water-swellable layer 116b. In other words, water-swellable components 116 sandwich the plurality of ribbons 113 of the non-stranded stack, thereby forming a cable core. Consequently, the ribbon(s) 113, major surfaces of water-swellable components 116, and major (horizontal) surfaces of cavity 111 are generally aligned (i.e., generally parallel) to create a compact structure. Additionally, water-swellable components 116 contact at least a portion of respective the top or bottom ribbons. In other embodiments, one or more elongate tapes may be wrapped about the optical fibers or disposed on one or more sides thereof. By way of example, compressible layer 116a is a foam layer such as open cell polyurethane material and water-swellable layer 116b is a water-swellable tape. However, other suitable materials are possible for the compressible layer and/or water-swellable layer or portion. As shown, compressible layer 116a and water-swellable layer 116b are attached together, but they may be applied as individual components. Generally speaking, water-swellable component 116 is multi-functional since it provides a degree of coupling for the ribbons 113, inhibits the migration of water along cavity 111, cushions the ribbons/optical fibers, and allows movement and separation of the ribbons (or optical fibers) to accommodate bending of distribution cable 110. In other embodiments, distribution cables may use other cable components disposed within the cavity 111 for coupling the optical fibers, cushioning the optical fibers, and/or water-blocking. For instance, distribution cables may use a foam tapes or extruded foam that does not include a water-blocking characteristic.

As depicted, cavity 111 has a generally rectangular shape with a fixed orientation to accommodate the non-stranded ribbon stack, but other shapes and arrangements of the cavity are possible such as generally square, round, or oval. By way of example, cavity may be rotated or stranded in any suitable manner along its longitudinal length. The cavity can also have a partial oscillation through a given angle, for instance, the cavity can rotate between a clockwise angle that is less than a full rotation and then rotate counter-clockwise for less than a full rotation. Furthermore, cavity 111 may be offset towards one of the planar surfaces of distribution cable 110, thereby allowing easy opening and access from one side.

Ribbons 113 used in distribution cable 110 can have any suitable design or ribbon count. For instance, ribbons 113 can have a splittable construction using one or more subunits or stress concentration as known in the art, thereby allowing separation of the ribbon into smaller groups of optical fibers. For instance, a ribbon may use subunits each having four optical fibers; however, ribbons without subunits are possible and subunits may have different fiber counts. Subunits allow predetermined splitting of the optical fiber ribbons into predictable smaller fiber count units before splitting along its length with tool 50. In one embodiment, each of the depicted ribbons 113 includes six four-fiber subunits for a total of twenty-four optical fibers. Of course, other numbers of optical fibers per ribbon, number of ribbons, and/or other suitable subunit configurations are possible such as two twelve fiber units, three eight fiber units, or six four fiber units depending on the requirements of the network architecture. Examples of suitable optical fiber arrangements include ribbons with or without subunits, ruggedized ribbons having a tight-buffer layer, tight-buffered or colored optical fibers, loose optical fibers in a tube, optical fibers in a module, or optical fibers disposed in a bundle.

Additionally, ribbons 113 of this explanatory embodiment of distribution cable 110 have an excess ribbon length (ERL) of about 0.5% or more such as in range of about 0.6% to about 0.8% to accommodate bending and/or coiling of distribution cable 110, but the amount of ERL used may vary based on the specific cable design. The ERL of ribbons 113 is related to the ERL of the ribbons within the cable and is different than the loading of ERL in the distribution optical fiber using the indexing tube as briefly discussed above. The minimum bend radius of the distribution cable 110 is about 125 millimeters which allows the cable to be coiled in a relatively small diameter for slack storage. Of course, distribution cables with other suitable fiber/ribbon counts may have other ERL values and/or cable dimensions. Illustratively, cables similar to distribution cable 110 could have four ribbons with different fiber counts such as: (1) twelve fiber ribbons with a major cable dimension W of about 12 millimeters or less for a total of forty-eight optical fibers; (2) thirty-six fiber ribbons with a major cable dimension W of about 18 millimeters or less for a total of one-hundred and forty-four optical fibers; or (3) forty-eight fiber ribbons with a major cable dimension W of about 21 millimeters or less for a total of two-hundred and sixteen optical fibers.

Additionally, cavity 111 has a cavity height CH and a cavity width CW suitable for the desired arrangement of optical fibers, ribbon, or the like. By way of example, each ribbon 113 has a height of about 0.3 millimeters for a total ribbon height of about 1.2 millimeters (4 times 0.3 millimeters) and the cavity height CH is about 5.5 millimeters for cavity 111. Cavity width CW is generally determined by the width of the ribbons (or number of optical fibers) intended for the cable and would be about 7.5 millimeters for the twenty-four fiber ribbons. In this embodiment, water-swellable components 116 each have an uncompressed height of about 1.8 millimeters, but other suitable uncompressed heights are possible. The compression of water-swellable components 116 in the cable is the localized maximum compression of the same and generally occurs where the ribbon or ribbon stack has the maximum displacement from the neutral axis if the cable includes a positive ERL (i.e., the ribbons undulate within the cavity).

Illustratively, the explanatory embodiment has a total height for the uncompressed water-swellable components 116 and ribbon 113 of about 4.8 millimeters, which is less than the cavity height CH of 5.5 millimeters. Consequently, a normalized ribbon pullout force is generally caused by the undulating ribbon stack causing localized maximum compression of the water-swellable components 116 due to the ERL and/or friction. By way of example, proper coupling of the ribbon stack (or ribbons or optical fibers) may be achieved when the combined uncompressed height of the dry inserts is about 40% or more of the cavity height CH such as by using two 1 millimeter water-swellable components 116 within a cavity having a cavity height CH of about 5 millimeters. Of course, other suitable ratios are possible as long as optical performance is preserved. In the explanatory embodiment, the combined uncompressed height (2 times 1.8 millimeters equals 3.6 millimeters) of water-swellable components 116 is about 65% of the cavity height CH (5.5 millimeters), which is more than 50% of the cavity height CH. Of course, the cavity, ribbons, and/or water-swellable components 116 can have other suitable dimensions while still providing suitable performance. For instance, thinner ribbons and/or water-swellable components may be used. Although cavity 111 is depicted as rectangular it may be difficult to make a rectangular cavity as shown, i.e., the extrusion process may create the cavity with a somewhat irregular rectangular shape. Likewise, the cavity can have other suitable shapes besides generally rectangular such as oval, round or the like, which may generally change the relationship (alignment) among the dry insert, ribbon, and/or cavity.

Generally speaking, positioning water-swellable components 116 on opposite ends of the ribbon stack (or single ribbon or loose optical fibers) aids in influencing and maintaining a generally uniform ERL distribution along distribution cable 110 during different conditions, thereby helping to preserve optical performance. Moreover, ribbon to cable coupling is beneficial for influencing a relatively even ERL distribution along the cable such as during bending, which generally allows for small cable bend radii. Other factors such as the size of cavity and/or compression of the dry insert(s) may also influence ERL/EFL distribution along the cable.

Another optical performance aspect of distribution cables having a generally flat profile with a non-stranded ribbon stack is the total amount of ERL required for suitable cable performance. The amount of ERL for adequate cable performance generally depends on the cable design such as the number of ribbons. Generally speaking, the minimum ERL for cables having a single ribbon is determined by the desired allowable level of fiber strain at the rated cable load; whereas, the minimum ERL for a multiple ribbon cable is generally influenced by bending performance. More specifically, when selecting the minimum ERL limit for a cable design the strength member geometry and material (i.e. cross-sectional area and Young's modulus) should be considered for calculating the desired level of fiber strain at the rated tensile load of the cable design. Additionally, the amount of ERL required for bending generally increases as the number of ribbons in the stack increases since the outer ribbons of the ribbon stack are farther from the neutral axis of the cable. However, there are limits on the upper end of ERL for suitable optical performance (i.e. too much ERL can degrade optical performance). Furthermore, distribution cables having relatively high levels of ERL such as in the range of 0.6% to 1.5% may be suitable for self-supporting installations such as NESC heavy loading, but the particular ERL for a given design should have the desired cable performance. On the other hand, distribution cables similar to distribution cable 110 having loose optical fibers may have lower values of excess fiber length (EFL) such as about 0.2% EFL since all the optical fibers are located near the neutral axis of the cable.

Figure 12:
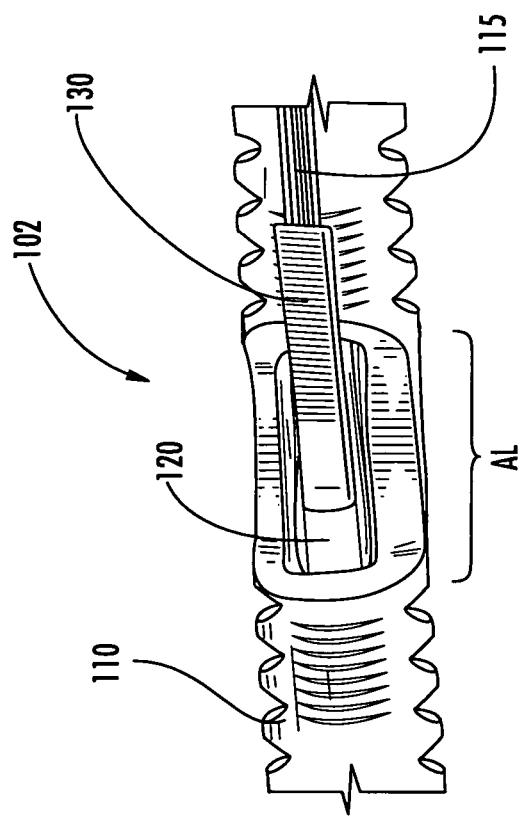

Returning to cable assembly 100, FIGS. 12-16 depict perspective views showing portions of distribution cable 110 in various stages of construction (i.e., subassemblies) for explaining the method of making cable assembly 100. FIG. 12 depicts distribution cable 110 after access location AL is made in protective covering 118 and distribution optical fibers 115 are cut within distribution cable 110 and routed through the opening at access location AL with cap 120 and transition tube 130 installed, thereby forming a subassembly 102 of cable assembly 100. From subassembly 102, a variety of distribution cables may be constructed such as cable assembly 100 shown in FIGS. 7 and 8 or a cable assembly 200 as shown in FIGS. 17 and 18. Furthermore, subassembly 102 or other subassembly constructions are suitable for deployment in the field. Simply stated, the distribution optical fibers of subassembly 102 are presented outside of the distribution cable for use by the craft in the field. If used in this manner, a tape or other covering may be disposed about the distribution optical fibers and/or access location for protecting the same until access is needed in the field.

Subassembly 102 is formed as described below. First, protective covering 118 of distribution cable 110 about access location AL is roughened by scalloping and/or flame brushing as shown. Roughening protective covering 118 improves the adhesion of sealing portion 190 with the same and is easier and safer to accomplish before opening protective covering 118. Thereafter, an opening 118a of access location AL is made in protective covering 118. Opening 118a may be any suitable length and in this case is about 25 millimeters long. Any suitable cable entry tool may be used for opening protective covering 118 such as a utility knife or the like. After opening protective covering 118, a portion of the top water-swellable component 116 of distribution cable 110 is exposed at access location AL. The exposed portion of water-swellable component 116 is removed such as by cutting with a scissors, thereby allowing for easier access to the optical fibers within distribution cable 110. Thereafter, the desired optical fibers for distribution are selected for cutting within the distribution cable and special tools such as the dividing tool may be used. In this example, less than all of the optical fibers of the top ribbon are selected for distribution so the top ribbon includes split S between optical fibers like depicted in FIG. 6f. Specifically, four optical fibers of the top ribbon are selected to become distribution optical fibers at access location AL. Of course, optical fibers from other ribbons in the stack may be selected for distribution. Additionally, if the ribbon(s) above the ribbon being accessed have already been used, the used ribbons may be removed for access to the desired optical fibers for distribution. Split S in the top ribbon is made by the craft using a suitable tool and/or their fingers. Thereafter, cutting element 58 of tool 50 is positioned about split S like depicted in FIG. 6f. Then, the slack of cutting element 58 is taken up and tool 50 is slid into cavity 111 of distribution cable 110, thereby splitting the ribbon between optical fibers along its longitudinal length as tool 50 moves into position. After tool 50 is positioned at the cutting location CL within distribution cable 110 cutting element 58 is pulled with sufficient force to cut distribution optical fibers 115 within distribution cable 110.

In this case, tool 50 is inserted so as to cut distribution optical fibers 115 about 175 millimeters downstream from access location AL. Consequently, the distribution optical fiber length DOFL is about seven (7) times longer than the access length AL. After tool 50 is removed from distribution cable 110, distribution optical fibers 115 are pulled out of cavity 111 and presented outward of protective covering 118. Next, cap 120 (which is similar to cap 64) and transition tube 130 (which is similar to transition tube 62) that are sized and shaped for distribution cable 110 with its access location AL are installed like shown in FIG. 6e. More specifically, transition tube 130 has a length of about 65 millimeters and a generally rectangular shape for sliding over optical fibers split from optical fiber ribbon 113 and cap 120 is generally flat and has a length that is slightly longer than access location AL so that a portion may fit within cavity 111 of distribution cable 110. Transition tube 130 is slid over distribution optical fibers 115 so that about 35 millimeters is disposed within cavity 111 of distribution cable 110. Then, the exposed end of and transition tube 130 is routed through an opening 120a of cap 120 and cap 120 is positioned so that a portion of the same is tucked into cavity 111 of distribution cable 110. As before, cap 120 closes access location AL and transition tube 130 protects distribution optical fibers 115 as they are routed out of distribution cable 110. Thereafter, a material (not shown) such as a hot melt adhesive is applied above cap 120 and about transition tube 130 for securing cap 120 and transition tube 130 at the opening of the access location like as shown in FIG. 6f.

Figure 13:
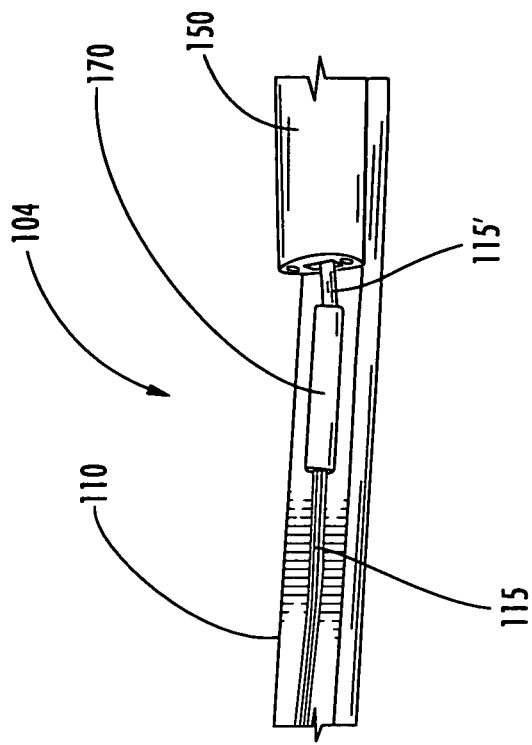
Figure 19A:
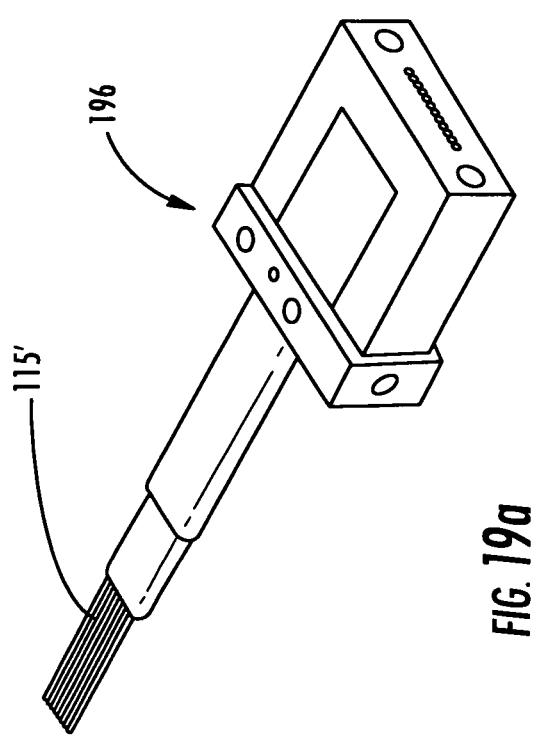
FIG. 19a is a perspective view of a ferrule attached to a distribution optical fiber according to the present invention.
Figure 19B:
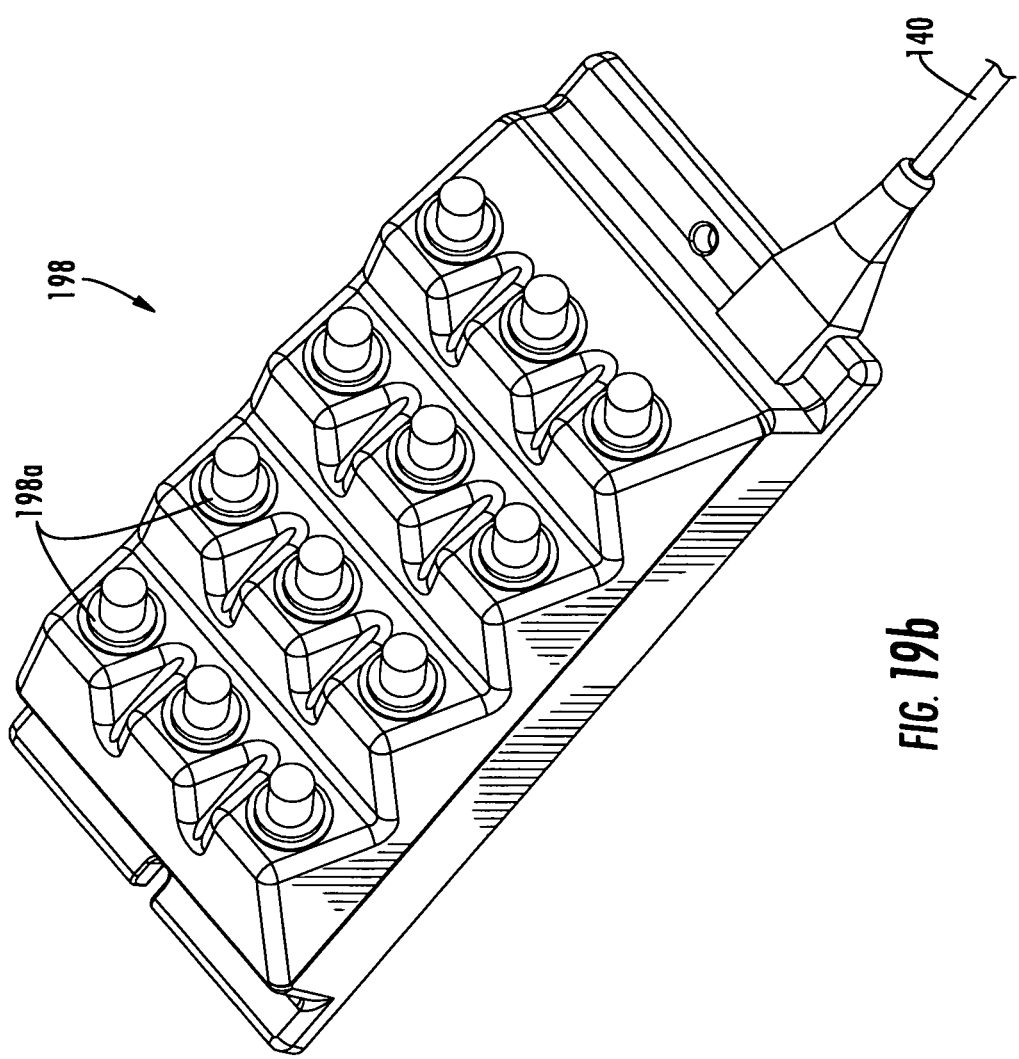
FIGS. 19b-19e are perspective views of assemblies for plug and connectivity according to the present invention.
Figure 19C:
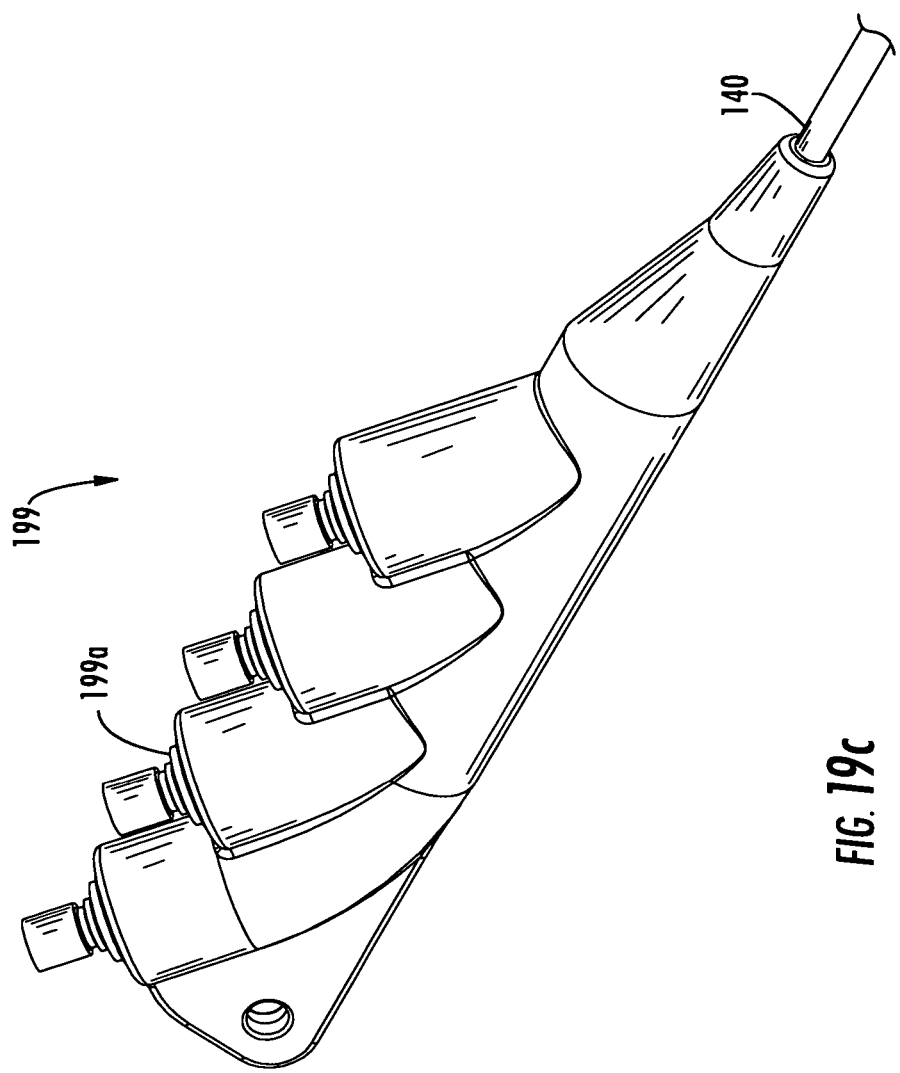
Figure 19D:
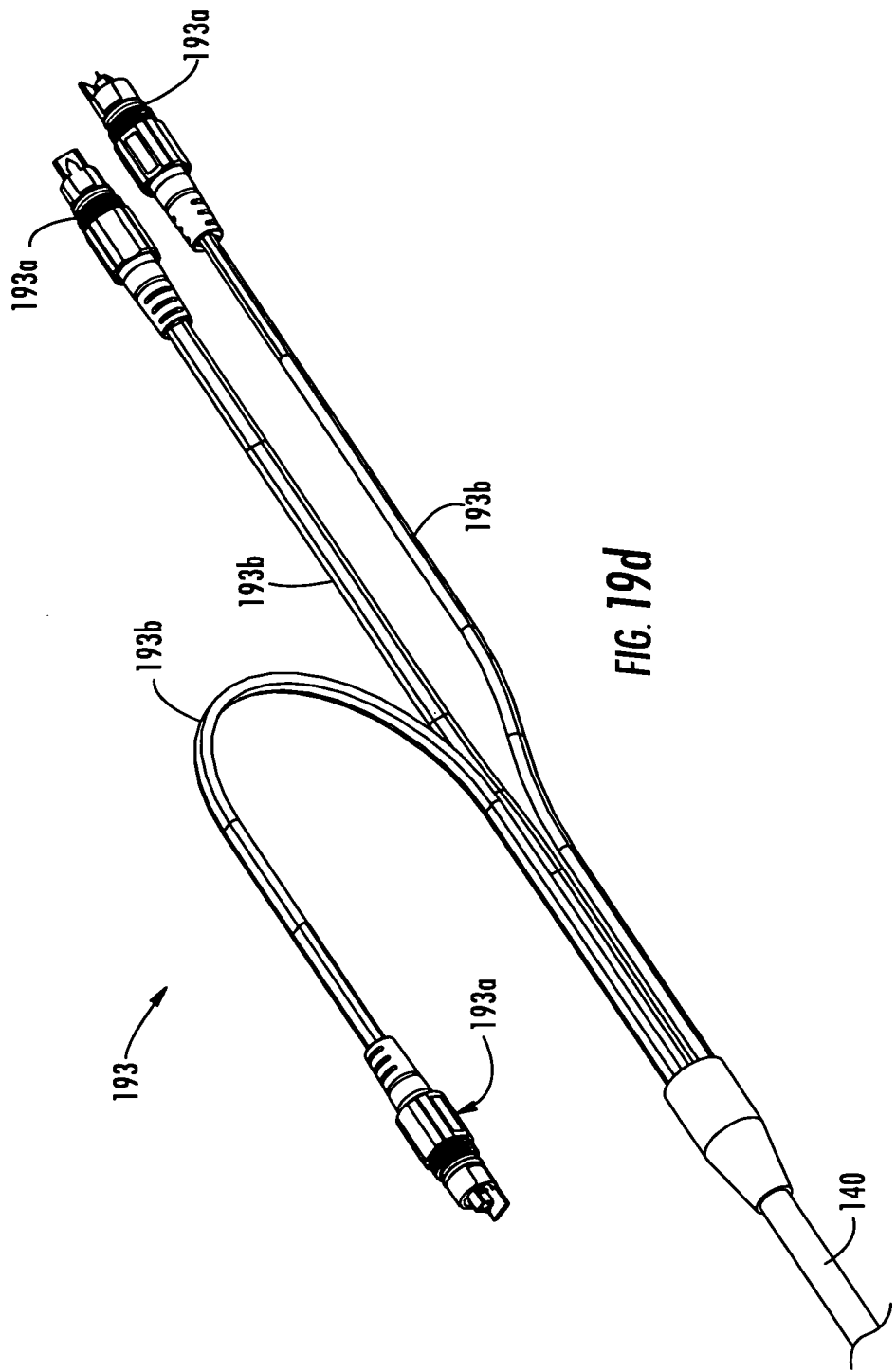
Figure 19E:
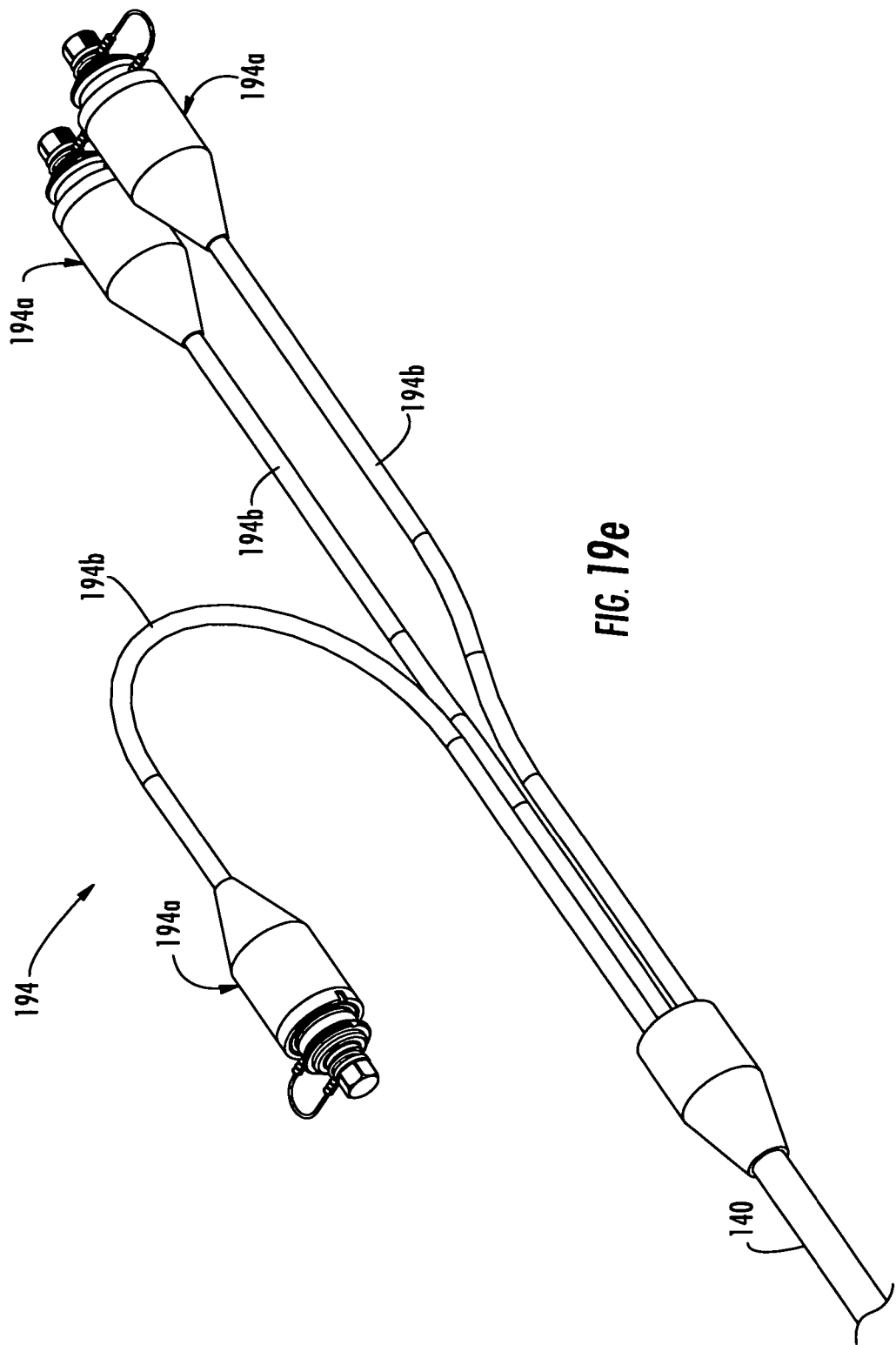

FIG. 13 depicts a perspective view of another subassembly 104 of cable assembly 100 for explaining the method of making. More specifically, FIG. 13 shows subassembly 102 of FIG. 12 after splicing distribution optical fiber 115 with distribution optical fiber pigtail 115' and protecting the splice location with splice protector 170. For this embodiment and access location of cable assembly 100, the distribution optical fiber pigtail 115' is a four fiber ribbon that is mass fusion spliced with the distribution optical fibers 115 that were split out of the top ribbon. In other words, distribution optical fiber pigtail 115' is in optical communication with distribution optical fiber 115 and becomes part of the same. Moreover, this step increases the length of the distribution optical fiber based upon the desired connectivity configuration such as the length of the tether tube or other configurations. Splice protector 170 is used for protecting and immobilizing the splice (not visible) and may be pushed onto distribution optical fiber pigtail 115' before splicing and then positioned over the splice after it is made. Likewise other components may be slid over distribution optical fiber pigtail 115' depending on the configuration of the embodiment. Like subassembly 102, a variety of distribution cables may be constructed from subassembly 104 or other similar subassemblies. Cable assembly 100 includes tether tube 140 with a distribution optical fiber stub (the second end of distribution optical fiber pigtail 115') for optical connectivity, but other configurations are possible. For instance, the second end of the distribution optical fiber 115' can have one or more ferrules attached thereto and the ferrule may be a portion of a receptacle, plug, or the like for plug and play connectivity. As an example, FIG. 19 depicts a second end of tether tube 140' having the distribution optical fiber attached to a ferrule that is a portion of plug 195 as known in the art. Of course, the second end of tether tube 140' can have any suitable configuration for connectivity such as splice-ready optical fibers, a connector or a receptacle having a ferrule, a multi-port or the like, thereby allowing the craft flexibility for downstream connectivity. Illustratively, FIG. 19a depicts distribution optical fibers 115' attached to a ferrule 196. Ferrule 196 is a multifiber ferrule, but single fiber ferrules may be attached to one or more distribution optical fibers. FIG. 19b depicts a multi-port 198 having a plurality of receptacles 198a attached to the end of tether tube 140. Likewise, FIG. 19c depicts another multi-port 199 having a plurality of receptacles 199a attached to the end of tether tube 140. FIGS. 19d and 19e depicts a branching of tether tube using furcation legs for providing plug and play connectivity. More specifically, FIG. 19d shows assembly 193 having a plurality of plugs 193a disposed on the ends of a plurality of furcation legs 193b and FIG. 19e shows assembly 194 having a plurality of receptacles 194a disposed on the ends of a plurality of furcation legs 194b. Of course, other types and/or structures are possible for optical connectivity such as single receptacle or the like. As explained below, cable assembly 100 has the splice disposed within the cavity of indexing tube 150 as will be explained below for protecting the splice and loading an ERL or EFL into the distribution optical fiber.

As best shown in FIG. 10a, splicing indexing tube 150 is slid over a portion of distribution optical fiber 115 and a portion of transition tube 130. Consequently, splice protector 170 is disposed within a cavity 150a of indexing tube 150 and fiber pigtail 115' extends from a second end of indexing tube 150. Furthermore, splice 170 can have an optional cushioning element (not shown) such as a foam tape disposed thereabout. For instance, the foam can be positioned about splice 170 such as folded over the same before indexing tube 150 is slid thereover. As further shown, indexing tube plug 160 is then pushed into the upstream end of indexing tube 150. Indexing tube plug 160 is used for inhibiting sealing portion 190 from being injected into indexing tube 150 in a further manufacturing process. Indexing tube plug 160 may be formed from any suitable material such as a foam, soft polymer, or the like and is sized for fitting into the cavity of the indexing tube 150 along with transition tube 130 as a light friction fit. Then, if desired, indexing tube 150 may be taped or secured to distribution cable 110 for holding the same in place at a suitable position. In this embodiment, indexing tube 150 is a portion of distribution cable 110 having an empty cavity as best shown by FIG. 11. In other words, indexing tube 150 is a portion of distribution cable 110 with the ribbons 113 and water-swellable components 116 removed from cavity 111 (i.e., just the protective covering 118 having strength members 114 embedded therein). Of course, the use of other suitable indexing tubes having other sizes and/or shapes such as round, square, etc is possible.

Figure 20:
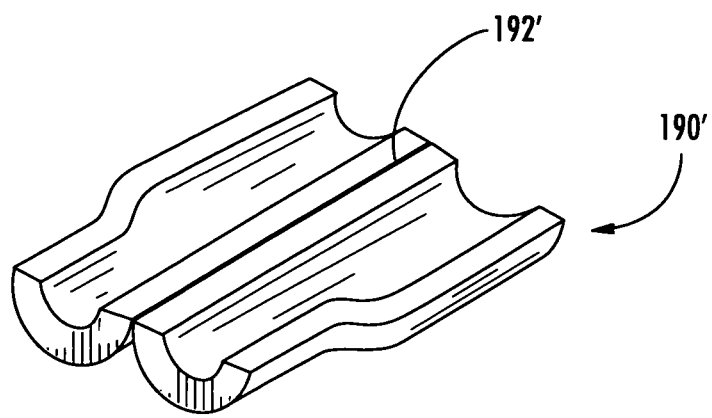
FIG. 20 is a perspective view of an alternative sealing portion according to the present invention.
Figure 20A:
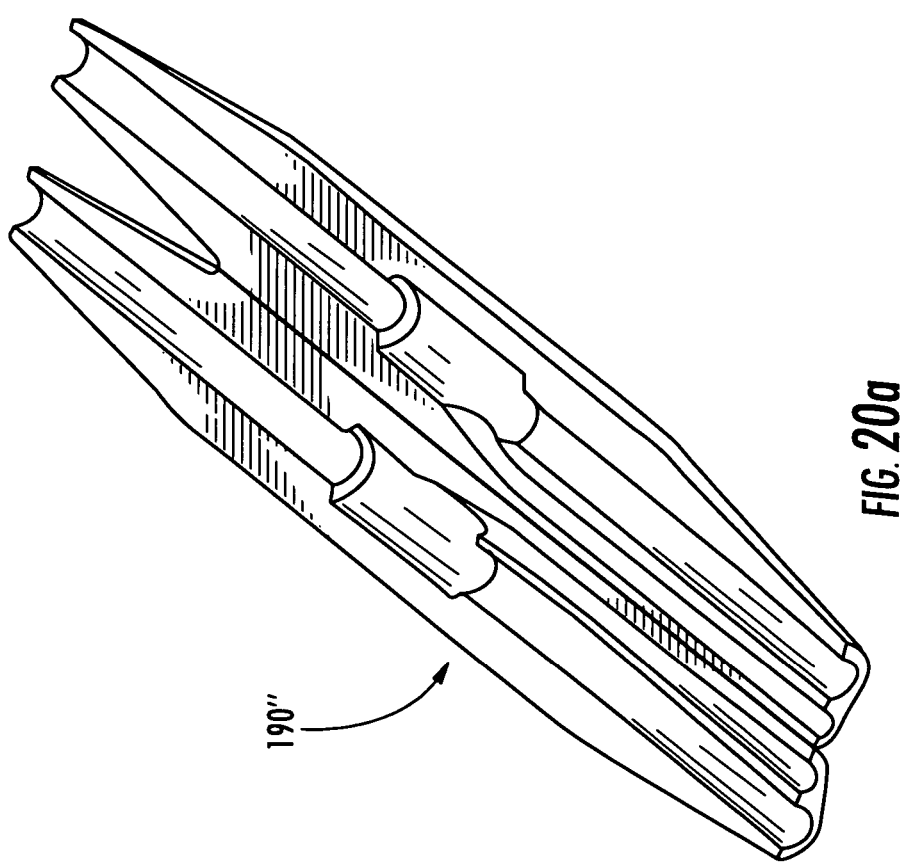
FIGS. 20a-20c are perspective views of an alternative fiber optic distribution cable according to the present invention.
Figure 20B:
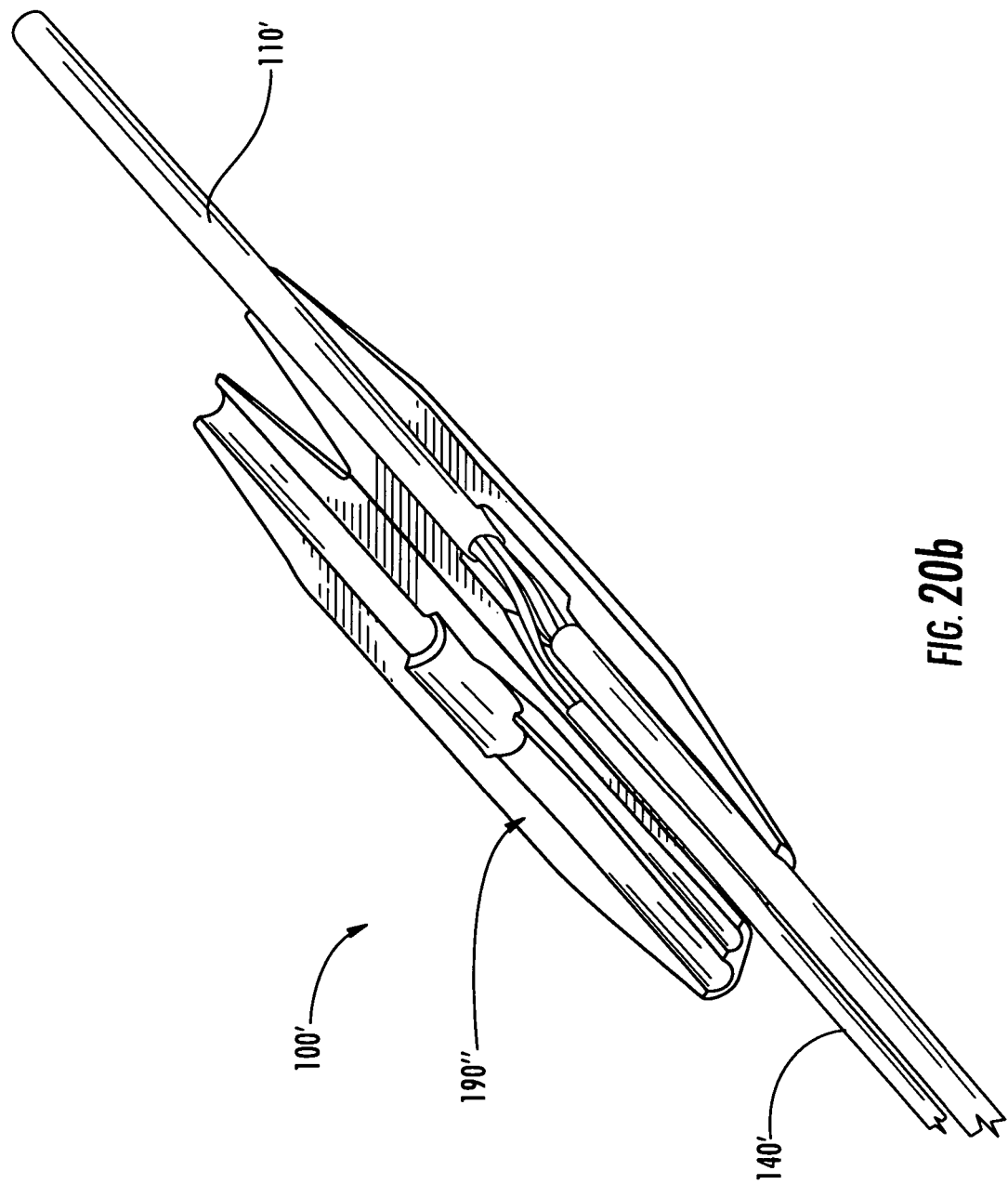
Figure 20C:
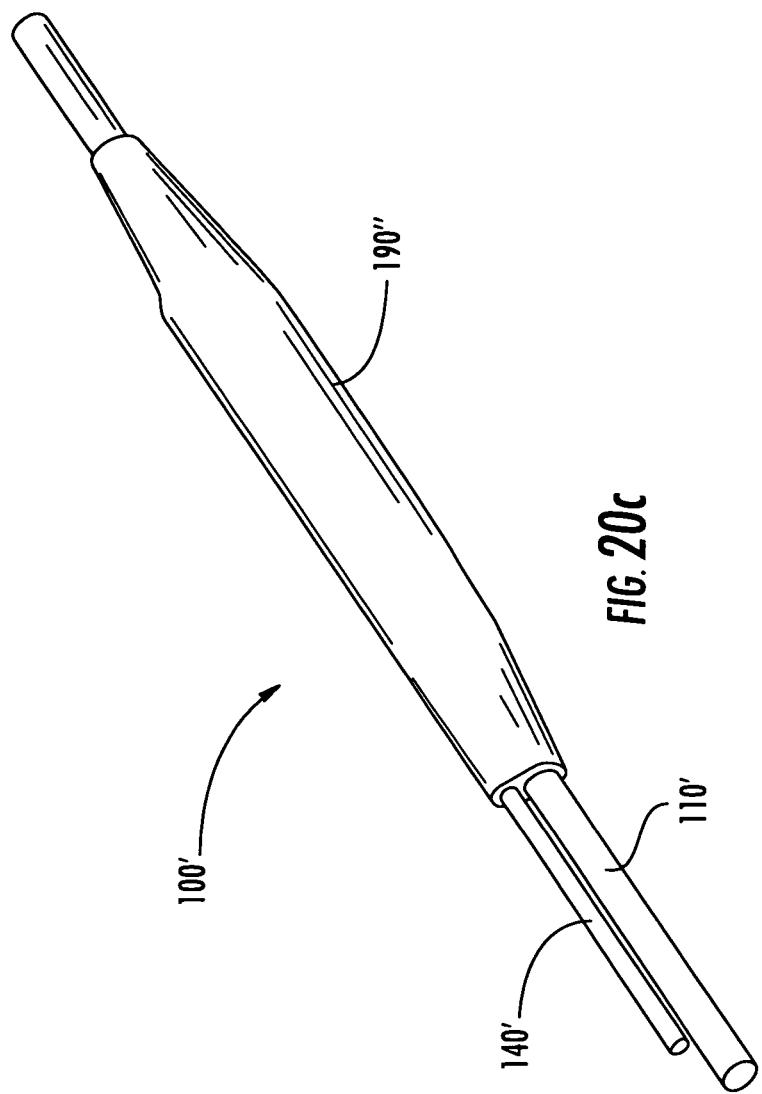

FIG. 14 depicts a perspective view of a subassembly 106 of cable assembly 100 disposed within a mold 192 as shown by the phantom lines before injecting a curable material for forming the sealing portion 190. Subassembly 106 further includes a step of applying a material 106a such as a hot melt adhesive for sealing and/or securing components of the assembly together such as fixing the position of transition tube 130. Applying material 106a inhibits the injected material from entering the opening of the access location, indexing tube 150, and/or from moving components during the overmolding process, thereby preserving optical performance. Additionally, it may be beneficial to heat up a portion of subassembly 106 shortly before forming sealing portion 190 therearound to promote bonding of sealing portion 190 with subassembly 106. Thereafter, subassembly 106 is placed into mold 192 as shown in FIG. 14 and sealing portion 190 is formed by injecting the sealing material into the mold under pressure. Sealing portion 190 provides environment protection for the access location AL and may provide structural integrity. In this embodiment, sealing portion 190 is a 2-part material formed of isocyanate resin and polyol hardener available from Loctite. In this embodiment, sealing portion 190 has a generally uniform minimum wall thickness of about 3-5 millimeters, but other dimensions are possible. Other methods and/or materials for making sealing portion 190 are possible so long as they meet the requirements of the desired application. Sealing portion 190 can be formed by techniques or manufacturing methods other than by injecting a curable material into a mold. For example, FIG. 20 depicts a sealing portion 190' that is a preformed shell that fits over subassembly 106 and then has heat (or other reactions) for partially or totally melting and/or forming the same, thereby sealing the access location. More specifically, sealing portion 190' has a hinge line 192' for allowing the same to be folded about subassembly 106. In other embodiments, sealing portion 190' can be two or more separate portions. Sealing portions such as sealing portions 190' can be used with any suitable distribution cable. By way of example, FIGS. 20a-c depict the use of an alternative sealing portion 190'' with a distribution cable 110' and tether tube 140' that have round cross-sections, thereby forming cable assembly 100'. In still further embodiments, a ruggedized tubing (not shown) may be placed about the access location and then injected with a suitable material for sealing the ends or the entire ruggedized tubing. If the application allows, sealing portion 190 may also be formed using a heat shrink tubing disposed about the access location.

Figure 16:
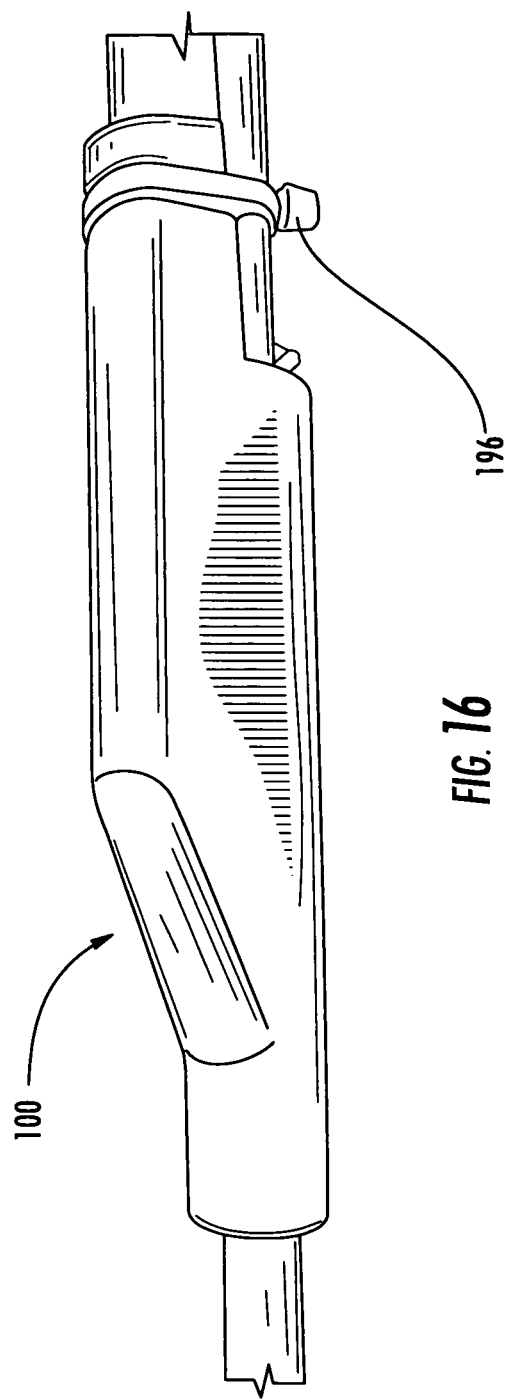

FIG. 15 depicts a perspective view of a subassembly 108 of cable assembly 100 before tether tube 140 is indexed with respect to indexing tube 150. More specifically, indexing tether tube 140 into and relative to indexing tube 150 enables the loading a predetermined amount of ERL into distribution optical fiber 115 and/or distribution optical fiber pigtail 115'. Consequently, the ERL or EFL of the distribution optical fiber inhibits forces from being applied to the same that may cause reliability and/or optical attenuation issues. As best depicted in FIG. 10, cavity 150a of indexing tube 150 is sized so that tether tube 140 fits into the same. FIG. 9 shows that tether tube 140 includes a plurality of strength members 142 disposed on opposite sides of a cavity 141 and houses a portion of distribution optical fiber 115' therein. Tether tube 140 has a generally flat shape, but other sizes and/or shapes of tether tube may be used with the concepts of the present invention. FIG. 15 shows tether tube 140 disposed within a portion of indexing tube 150 and pulled taut for removing excess ribbon length as represented by mark M1. Thereafter, tether tube 140 is pushed (i.e., indexed) into indexing tube 150 a predetermined distance D represented by mark M2. In this cable assembly, distance D is about 5 millimeters, thus an ERL of about 5 millimeters is introduced into the distribution optical fiber that generally speaking accumulates within the indexing tube 150. Of course, other suitable distances D may be used for loading the desired ERL or EFL. After indexing occurs tether tube 140 needs to be fixed in position for maintaining the ERL or EFL. As shown in FIG. 7 heat shrink tubing 180 is applied over a portion of tether tube 140 and a portion of indexing tube 150 for maintaining the relative positions, but other methods are possible for maintaining relative positions such as overmolding or the like. Additionally, it should be understood that the method of indexing a first tube with a second tube for providing ERL or EFL may be used without the step of cutting the distribution optical fiber within the distribution cable. Of course, other variations are possible for cable assembly 100. By way of example, FIG. 16 depicts cable assembly 100 having an optional cable tie 196 for securing distribution cable 110 and sealing portion 190 near the downstream end, thereby inhibiting a separation force between the two.

As discussed above, subassemblies of the present invention may be constructed into other cable assembly configurations. By way of example, FIGS. 17 and 18 depicts cable assembly 200 which includes subassembly 102 having a distribution optical fiber pigtail 115' spliced thereto and protected by a splice protector 270. As best shown in FIG. 18, distribution optical fiber pigtail 115' includes a ferrule (not visible) attached thereto. In this embodiment, the ferrule is a multifiber ferrule. Moreover, the ferrule is a portion of a connector body 220, thereby providing plug and play optical connectivity at the access location, instead of at the end of the tether tube.

Of course, cable assemblies 100 and 200 are examples of a multitude of distribution cables made according the concepts of the disclosure. As discussed, other assemblies could use other cable cross-sections or have fewer, more, and/or different components. By way of example, the sealing portion 190 of distribution cable 100 may include a segmented end 190a as shown by the phantom lines in FIG. 7. Segmented end 190a allows some strain relief for the leading end of the distribution location. Additionally, cable assemblies of the present invention can include other components such as for aiding the installation of the same into a duct. By way of example, FIG. 21 depicts a distribution cable 300 having a pulling safety device 302 disposed ahead of the access location as depicted. More specifically, pulling safety device 302 allows the craft to detect blockages and/or constrictions in a duct so that the craft does not damage the access location trying to pull the distribution cable past the blockage or constriction in the duct. In this embodiment, safety pulling device is sized to be slightly larger than the sealing portion 190, thereby allowing the craft to sense an increased force and/or damage pulling safety device 302 before reaching the access location. Of course, the safety pulling device could have a size and/or shape that is similar or the same as the sealing portion. Consequently, the craft can pull the distribution cable out of the duct before damaging the same and repair or clear the duct before trying to reinstall the distribution cable. In other embodiments, safety pulling device can be shaped to promote twisting or alignment of the distribution cable to fit past the blockage or constriction.

It will be apparent to those skilled in the art that various modifications and variations can be made to the present invention without departing from the spirit and scope of the invention. For instance, the concepts described herein can be applied to any suitable fiber optic cable designs. Likewise, fiber optic cables may include other suitable cable components such as ripcords or the like or other components for optical connectivity. Thus it is intended that the present invention cover the modifications and variations of this invention provided they come within the scope of the appended claims and their equivalents.

We claim:
1. A fiber optic distribution cable comprising:
a fiber optic distribution cable, the fiber optic distribution cable having a plurality of optical fibers and a protective covering;
at least one distribution optical fiber, the at least one distribution optical fiber being selected from one of optical fibers of the fiber optic distribution cable, the at least one distribution optical fiber protruding from an access location of the protective covering;
a sealing portion disposed about the access location;
an indexing tube, the indexing tube having a portion secured by the sealing portion and another portion of the indexing tube extending beyond the sealing portion; and
a tether tube, the tether tube being disposed about a portion of the at least one distribution optical fiber for protecting the at least one distribution optical fiber, wherein the tether tube is attached at a predetermined position relative to the indexing tube, thereby loading an excess fiber length in the distribution optical fiber.

2. The fiber optic distribution cable of claim 1, further including a heat shrink tubing disposed about a portion of the indexing tube for maintaining a relative position between the indexing tube and the tether tube.

3. The fiber optic distribution cable of claim 1, wherein the access location has a length AL and the distribution optical fiber has a distribution optical fiber length DOFL of about 5/4 AL or more before splicing.

4. The fiber optic distribution cable of claim 1, the fiber optic distribution cable having a cross-section that is non-round.

5. The fiber optic distribution cable of claim 1, the fiber optic distribution cable having a cross-section that is non-round and the tether tube having a cross-section that is non-round.

6. The fiber optic distribution cable of claim 1, a cross-sectional maximum dimension of the fiber optic distribution cable being about 30 millimeters or less.

7. The fiber optic distribution cable of claim 1, further including a transition tube for the distribution optical fiber.

8. The fiber optic distribution cable of claim 1, further including a cap for closing the access location.

9. The fiber optic distribution cable of claim 1, further including a cap for closing the access location and a transition tube for protecting a portion of the distribution optical fiber.

10. The fiber optic distribution cable of claim 1, wherein the distribution optical fiber is at least one optical fiber of an optical fiber ribbon.

11. The fiber optic distribution cable of claim 1, further including a ferrule attached to the distribution optical fiber for optical connectivity.

12. The fiber optic distribution cable of claim 1, further including a tether tube, the tether tube being disposed about a portion of the distribution optical fiber for protecting the distribution optical fiber and a ferrule attached to the distribution optical fiber for optical connectivity.

13. The fiber optic distribution cable of claim 1, wherein the fiber optic distribution cable has a dry construction.

14. The fiber optic distribution cable of claim 1, the fiber optic distribution cable including a non-stranded stack of fiber optic ribbons.

15. The fiber optic distribution cable of claim 1, the fiber optic distribution cable including a non-stranded stack of fiber optic ribbons and a first water-swellable component disposed on a first side of the non-stranded stack and a second water-swellable component disposed on a second side of the non-stranded stack.

16. The fiber optic distribution cable of claim 1, further including a plurality of access locations.

17. A fiber optic distribution cable comprising:
a fiber optic distribution cable, the fiber optic distribution cable having a plurality of optical fibers and a protective covering;
at least one distribution optical fiber, the at least one distribution optical fiber being selected from one of optical fibers of the fiber optic distribution cable, the at least one distribution optical fiber protruding from an access location of the protective covering, wherein the access location has a length AL and the distribution optical fiber has a distribution optical fiber length DOFL of about 5/4 AL or more before splicing;
a sealing portion disposed about the access location;
an indexing tube, the at least one distribution optical fiber being routed into the indexing tube and having an optical fiber splice therein for extending the length at least one distribution optical fiber and a portion of the indexing tube secured by the sealing portion and another portion of the indexing tube extending beyond the sealing portion; and
a tether tube, the tether tube being disposed about a portion of the at least one distribution optical fiber for protecting the at least one distribution optical fiber, wherein a portion of the tether tube is disposed within the indexing tube at a predetermined position relative to the indexing tube, thereby loading an excess fiber length in the distribution optical fiber.

18. The fiber optic distribution cable of claim 17, further including a heat shrink tubing disposed about a portion of the indexing tube for maintaining a relative position between the indexing tube and the tether tube.

19. The fiber optic distribution cable of claim 17, the fiber optic distribution cable having a cross-section that is non-round.

20. The fiber optic distribution cable of claim 17, the fiber optic distribution cable having a cross-section that is non-round and the tether tube having a cross-section that is non-round.

21. The fiber optic distribution cable of claim 17, a cross-sectional maximum dimension of the fiber optic distribution cable being about 30 millimeters or less.

22. The fiber optic distribution cable of claim 17, further including a transition tube for the distribution optical fiber.

23. The fiber optic distribution cable of claim 17, further including a cap for closing the access location.

24. The fiber optic distribution cable of claim 17, further including a cap for closing the access location and a transition tube for protecting a portion of the distribution optical fiber.

25. The fiber optic distribution cable of claim 17, wherein the distribution optical fiber is at least one optical fiber of an optical fiber ribbon.

26. The fiber optic distribution cable of claim 17, further including a ferrule attached to the distribution optical fiber for optical connectivity.

27. The fiber optic distribution cable of claim 17, wherein the fiber optic distribution cable has a dry construction.

28. The fiber optic distribution cable of claim 17, the fiber optic distribution cable including a non-stranded stack of fiber optic ribbons.

29. The fiber optic distribution cable of claim 17, the fiber optic distribution cable including a non-stranded stack of fiber optic ribbons and a first water-swellable component disposed on a first side of the non-stranded stack and a second water-swellable component disposed on a second side of the non-stranded stack.

30. The fiber optic distribution cable of claim 17, further including a plurality of access locations.

* * * * *